United States Patent
Monson et al.

(10) Patent No.: US 10,699,072 B2
(45) Date of Patent: Jun. 30, 2020

(54) IMMERSIVE ELECTRONIC READING

(71) Applicant: Microsoft Technology Licensing, LLC, Redmond, WA (US)

(72) Inventors: Aaron James Monson, Issaquah, WA (US); Gregory Hitchcock, Woodinville, WA (US); Kevin Larson, Seattle, WA (US); Robert Matthew McKaughan, Seattle, WA (US); Mohammadreza Jooyandeh, Vancouver (CA); Alexandre Pereira, Vancouver (CA); Jeffrey Scott Petty, Seattle, WA (US); Pelle Haukali Nielsen, Vancouver (CA); Sebastian Michael Greaves, London (GB); Valentin Dobre, Vancouver (CA); Mark Frank Flores, Vancouver (CA); Dominik Messinger, Vancouver (CA); Michael Tholfsen, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/376,550

(22) Filed: Dec. 12, 2016

(65) Prior Publication Data
US 2018/0046331 A1 Feb. 15, 2018

Related U.S. Application Data

(60) Provisional application No. 62/374,569, filed on Aug. 12, 2016.

(51) Int. Cl.
*G06F 40/232* (2020.01)
*G06F 40/109* (2020.01)
(Continued)

(52) U.S. Cl.
CPC .......... *G06F 40/232* (2020.01); *G06F 3/0485* (2013.01); *G06F 40/109* (2020.01);
(Continued)

(58) Field of Classification Search
CPC .... G06F 17/214; G06F 17/273; G06F 3/0485; G06F 3/16; G06F 3/165; G06F 40/109;
(Continued)

(56) References Cited

U.S. PATENT DOCUMENTS 6,601,059 B1 * 7/2003 Fries ..................... G06F 17/273
7,194,411 B2 3/2007 Slotznick et al.
(Continued)

OTHER PUBLICATIONS

Dingler et al., "Assessment of Stimuli for Supporting Speed Reading on Electronic Devices", 2015, Copyright 2015, pp. 8 (Year: 2015).*
(Continued)

*Primary Examiner* — Chau T Nguyen

(57) ABSTRACT

Electronic reading devices provide readers with text on a display, and enhancements to their functionality and efficiency are discussed herein. Text is provided to the reader in an enhanced contrast mode that highlights the active word and line of the text as well as words of interest in the text so as to improve the functionality of the electronic reading device itself as a provider of textual content.

23 Claims, 15 Drawing Sheets

(51) Int. Cl.
*G06F 3/0485* (2013.01)
*G10L 13/10* (2013.01)
*G06F 3/16* (2006.01)
*G10L 13/08* (2013.01)

(52) U.S. Cl.
CPC .............. *G10L 13/10* (2013.01); *G06F 3/165* (2013.01); *G10L 2013/083* (2013.01)

(58) Field of Classification Search
CPC .. G06F 40/232; G10L 13/10; G10L 2013/083
See application file for complete search history.

(56) References Cited

U.S. PATENT DOCUMENTS

| | | | |
|---|---|---|---|
| 7,429,108 | B2 | 9/2008 | Rosenberg |
| 7,437,683 | B1 | 10/2008 | Beezer et al. |
| 8,731,905 | B1* | 5/2014 | Tsang ................. G06F 3/16 704/257 |
| 8,739,019 | B1 | 5/2014 | Nevins |
| 8,918,718 | B2 | 12/2014 | Burgess |
| 9,082,407 | B1* | 7/2015 | Faaborg ................. G10L 15/22 |
| 9,141,867 | B1* | 9/2015 | Matsuzuka ......... G06F 17/2705 |
| 9,324,240 | B2 | 4/2016 | Dohring et al. |
| 9,355,568 | B2 | 5/2016 | Stone |
| 2006/0194181 | A1 | 8/2006 | Rosenberg |
| 2007/0050190 | A1* | 3/2007 | Washio ................ G10L 15/22 704/249 |
| 2007/0271104 | A1 | 11/2007 | McKay |
| 2011/0167350 | A1 | 7/2011 | Hoellwarth |
| 2012/0001923 | A1* | 1/2012 | Weinzimmer .......... G06F 3/013 345/473 |
| 2012/0072224 | A1* | 3/2012 | Khitrov .................. G10L 13/08 704/260 |
| 2012/0122066 | A1 | 5/2012 | Dohring et al. |
| 2014/0013192 | A1* | 1/2014 | McQuiggan .......... G09B 5/062 715/203 |
| 2014/0127667 | A1 | 5/2014 | Iannacone |

OTHER PUBLICATIONS

Attarwala, et al., "An Accessible, Large Print, Listening and Talking E-book to Support Families Reading Together", In Proceedings of the 15th international conference on Human-computer interaction with mobile devices and services, Aug. 27, 2013, pp. 440-443.

Colombo, et al., "Design Guidelines for More Engaging Electronic Books: Insights from a Cooperative Inquiry Study", In Proceedings of the conference on Interaction design and children, Jun. 17, 2014, pp. 281-284.

Chansanchai, Athima, "Microsoft Hackathon 2015 winner extends OneNote to improve learning outcomes for students", Retrieved on: Aug. 10, 2016 Available at: http://news.microsoft.com/features/microsoft-hackathon-2015-winner-extends-onenote-to-improve-learning-outcomes-for-students/#sm.00001v4fju8ma8e5zwgiwu07wjcjs.

* cited by examiner

IMMERSIVE ELECTRONIC READING

CROSS-REFERENCES TO RELATED APPLICATIONS

The present disclosure claims priority to U.S. Provisional Patent Application No. 62/374,569 filed Aug. 12, 2016, the disclosure of which is hereby incorporated by reference in its entirety.

BACKGROUND

When presented with text, readers may often have their vision wander or trouble interpreting the text presented. These difficulties may be the result of a poorly chosen font, poor line spacing or angling, or another element on the page drawing the readers' attention. Wandering vision and interpretation problems are particularly common when readers use an electronic reading device (i.e., an e-reader) when dealing with unfamiliar words or struggling with a learning disability, such as dyslexia. When a reader's vision wanders, the reader may miss a portion of the text (e.g., skip to a word or line later in the text), the reader may repeat a portion of the text (e.g., skip to a word or line earlier in the text), or the reader may scan the text looking for a word of interest. Similarly, when interpretation problems arise, words may be skipped or misread. Skipping, misreading, and scanning prolong the reader's session—but not enjoyably. A prolonged reading session will require an e-reader to expend more power (which is of particular concern on mobile e-readers that draw power from batteries), and may require additional processing resources to be expended to break the text into more pages (e.g., in response to a request for a larger font). The reader, in turn, may choose to use a printed copy of the text instead of the e-reader to physically track read content (e.g., via highlighting, bookmarking, tabbing).

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are discussed herein to provide for an enhanced and more immersive reading experience that reduces wandering vision for a reader and improves the efficiency of an electronic reading device (i.e., an e-reader) used by the reader. Efficiency of the e-reader is improved by reducing the processing resources required to address user requests to reformat text presented on the e-reader, shortening the time to read a given text and thus reducing power draw by the e-reader, and improving the core functionality of the e-reader itself in providing text to the reader in a more legible format.

To reduce wandering vision, the e-reader provides, as options to the reader, several features to improve the readability of text. Such features include active line and active word highlighting, unfocused line lowlighting, word syllabication, part of speech identification, sentence diagramming, comprehension modes, and word vocalization. To provide these features, the text to be presented to the reader is parsed to identify metadata about the text, which is organized into an index. The index is provided to the e-reader for playback inline or separately from the text (e.g., in an immersive reading mode) based on selection by the reader. The text is then displayed to the reader based on the selections corresponding to one or more features.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
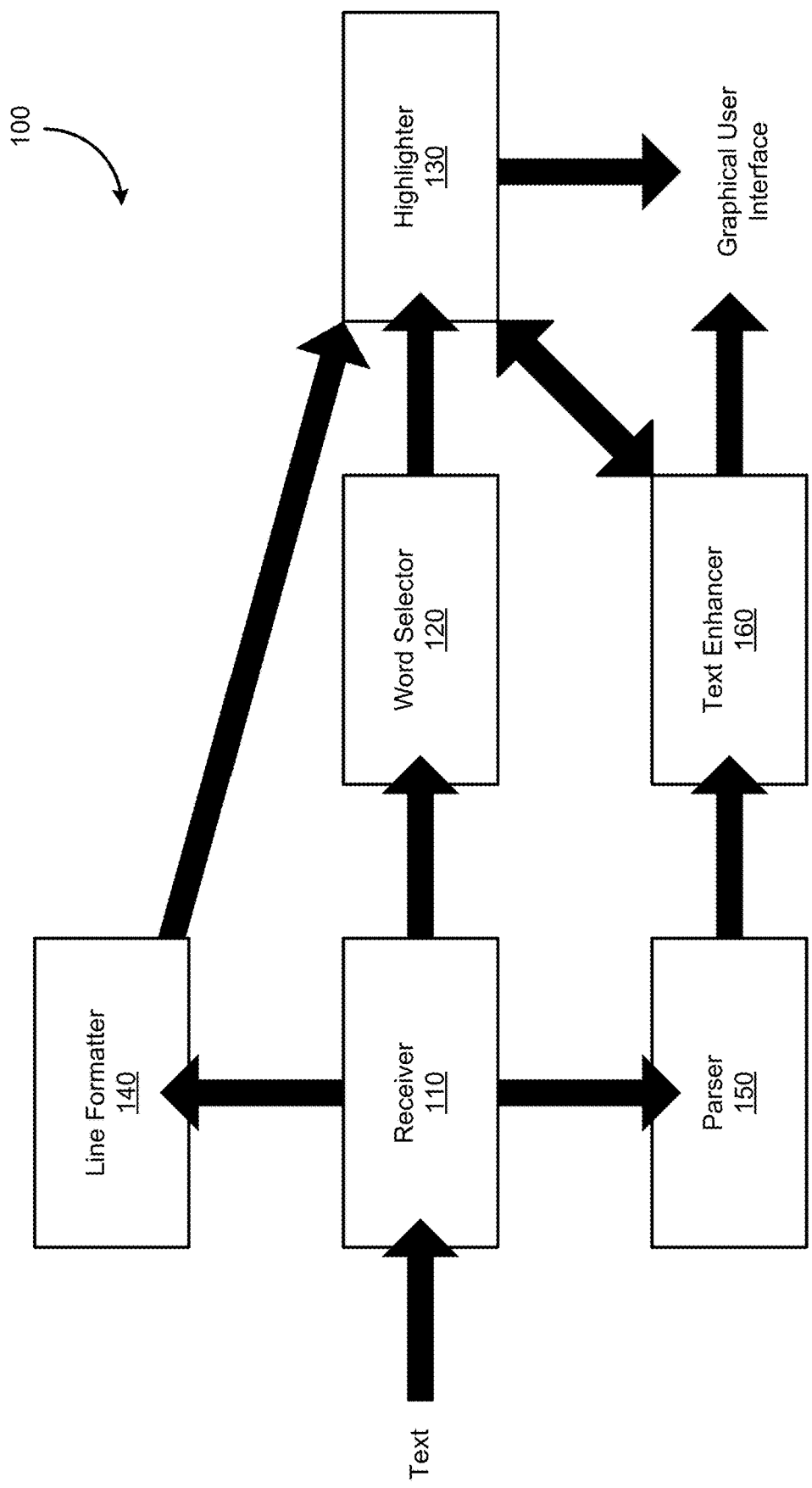
FIG. 1 is a block diagram illustrating various components of an example immersion reading environment.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 is a block diagram illustrating various components of an example immersion reading environment 100. The example immersion reading environment 100 includes: a receiver 110, operable to receive text and interpret inputs from reader using a reading application running on an e-reader; a word selector 120, operable to select a given word as the active word during readback; a highlighter 130, operable to affect the display of a graphical user interface (GUI) on which the text is presented on the e-reader to enhance the text for highlighting the active word during readback and, optionally, remove distracting formatting from the text or active word; an optional line formatter 140, operable to break text into lines if not already so divided; an optional parser 150, operable to build an index of metadata for effects to apply to the words of the text based on reader requests for those effects; and an optional text enhancer 160, operable uses the index in response to reader requests to apply effects to text, which may be done in conjunction with or independently of the effects applied to the GUI by the highlighter 130.

In various aspects, the example immersion reading environment 100 may be provided locally on a single device to the reader or may be provided via a distributed system, where certain actions are performed by a remote server and certain actions are performed by a local e-reader in communication with the remote server. For example, the line formatter 140 and parser 150 may be provided on a remote server that is passed parameters related to the display of the text on the e-reader and desired readback enhancements to construct an index for the e-reader to use in conjunction with readback to enhance the reader's immersion in the text.

As used herein, a reader is a human user of the e-reader, which may be any type of computing device used by the reader to consume text. Examples of e-readers include personal computers, laptops, tablets, smartphones, and dedicated e-readers, such as, for example, the Kindle® ebook reader, the Nook® ebook reader, and the Icarus™ ebook reader (respectively available from: Amazon.com, Inc. of Seattle, Wash.; Barnes & Noble of New York, N.Y.; and DistriRead of Eindhoven, NL). Text that the reader is presented to read may be organized according to paragraphs, pages, slides, tables, and may include inserted illustrations, figures, videos, hyperlinks, notes/comments, bookmarks, and the like depending on the application used by the e-reader to present text. Example applications include the Kindle® reading application, the Acrobat® reader application, the OneNote® notetaking application, the Google Docs™ word processor, (respectively available from: Amazon.com, Inc.; Adobe Systems, Inc. of San Jose, Calif.; Microsoft Corp. of Redmond, Wash.; and Alphabet, Inc. of Mountain View, Calif.) among other applications. Additionally, the e-reader may provide, on its display, content controls for the reader to manipulate the display and consumption of the text. The hardware of a computing device, such as an e-reader or a distributed system used along with the e-reader is discussed in greater detail in regard to FIGS. 5-7.

The receiver 110 is operable to communicate with a GUI of the e-reader or an application running on the e-reader to receive user preferences, commands, and text to be displayed to the reader. The receiver 110 may, in various implementations, be part of the application providing the text running on the e-reader, an extension or plugin for the application running on the e-reader, or a service running on a remote server in communication with the e-reader.

The word selector 120 is operable to determine what word in the text is active for the reader to focus on. In various aspects, the word selector 120 uses a cursor in the text to determine the word to apply focus to. In other aspects, a first word in a new section, a bookmark, a last input (e.g., a touch input), or a search result may be used by the word selector 120 to select a given word. Although words are typically delineated from one another by spaces in many languages, not all languages use spaces between words (e.g., Japanese) and the word selector 120 is therefore operable to delineate and separate words. The word selector 120 is further operable to identify slashed words, hyphenated words, and abbreviations (e.g., "and/or", "e-reader", "e.g.") as a single word or as multiple words, depending on preferences set for the reader.

During readback, the word selector 120 is operable to recursively select the next word to focus on from the text selection based on a readback speed as well as other factors. The factors may include, the punctuation proximate to a word, the number of syllables or characters comprising a word, a duration of a vocalization for that word, and a direction of text flow (e.g., left to right, right to left, top to bottom). For example, the word selector may initially choose the word "This" to focus on from the text selection of: "This is an example; it illustrates features." and successively choose "is", "an", etc., and the time between selecting each word may be set at a constant pace (e.g., X words per minute) or a variable length pause may be used according to the above mentioned factors. For example, a pause between selecting "is" and "an" may be shorter than the pause between selecting "example" and "it" due to the comparatively greater number of characters and syllables in "example" compared to "is" and the presence of the semicolon between "example" and "it". In addition to the number of syllables affecting a pause time between words, the word selector 120 may vary a duration of a pause between selecting words due to a greater number of characters comprising a word, a frequency of use of a word, the presence/absence of diphthongs, whether the word is recognized by a spellchecker, whether the word is recognized as a foreign loan word, whether the word is recognized as following or deviating from spelling norms (e.g., "centre" or "wyrm" versus "center" or "worm"), whether the word can be "sounded out", whether the word has homonyms (e.g., "whether" and "weather"), whether a word is above a grade/age level for a reader, etc. The word selector 120 may consult a dictionary of words meeting various criteria (e.g., a loan word dictionary, a homonym dictionary) or may use various rules to identify words meeting these criteria (e.g., the presence of certain character combinations like "ph", "eau", "sch", etc., italicization, or an "e" preceding an "i" not preceding a "c" (as in "weird")).

The highlighter 130 is operable to modify the GUI of the application used to present text on the e-reader to draw the reader's attention to the word selected for focus by the word selector 120. The highlighter 130 is operable to apply various levels of focus to the word selected by the word selector 120 and the line to which the selected word belongs. The text may be manipulated in the GUI by the highlighter 130 to increase readability of the focused word and line compared to the unfocused words and lines, which may be done by highlighting the focused word and line and/or lowlighting the parts of the text that are not selected by the word selector 120.

The highlighter 130 when highlighting (or lowlighting) ensures that the focused word has a greater contrast relative to its background than other words in the text to their backgrounds. For example, in the GUI the text box for the focused word may be black and the text for the focused word may be white, while the background for the other words in the text may be gray; providing a greater contrast for the focused word, but still allowing the other words to be read. By allowing the other words to be presented and read by the reader, the highlighter 130 directs focus the intended word without jarring the reader's attention, and while allowing the reader to take in adjacent lines and words. In various aspects, the highlighter 130 also ensures that the contrast between the other words in the focused line and their background is greater than the contrast between the words comprising unfocused lines and their background.

The contrast between the focused word and its background applied by the highlighter 130 will be the greatest contrast in the reading area, and the highlighter 130 may define other contrast differences below that. For example, the contrast between the focused line and its background may be greater than the contrast between the unfocused lines and their backgrounds, but less than the contrast between the focused word and its background.

As will be appreciated, contrast is a function of differences in luminance, and the colors (chrominances) that may applied to the text and backgrounds include more than grayscale. For example, the text and backgrounds may be various shades of blue, red, green, etc., or may include different colors for text and backgrounds (e.g., green text on red backgrounds, black/gray text on orange backgrounds, blue text on white/gray backgrounds). The highlighter 130 is operable to define these contrasts by providing the focused word with a unique background or font color with a greatest difference in luminances within the GUI of the e-reader for the text selection. The focused line is given one of the focused word's background or font color, but shares one of its font color or background color with the unfocused lines so that its contrast is less than the focused word, but greater than the unfocused lines, which have the lowest contrast between their text and backgrounds. The highlighter 130 thereby draws the reader's vision to the focused word and keep the reader's vision moving properly as readback of the text proceeds.

When highlighting the selected word for focus, the highlighter 130 is operable to add or remove font formatting from the selected word. For example, a bold, italic, strikethrough, underline, superscript, subscript, or small caps format may be removed from the selected word while it is provided as the focus. Similarly, when the word receiving focus is associated with a link, the indicia for the link may be removed. For example, a link for a footnote, endnote, or hyperlink may have indicia of a super/subscript numeral or other identifying character (e.g., an asterisk, dagger, double dagger, etc.), a special color (e.g., blue for unfollowed hyperlinks), or a font effect (e.g., underline) removed when a given word is highlighted as the focus.

The highlighter 130 is further operable to change the font size and tracking of the focused line and word to improve their readability. For example, when a line or word is selected for focus, the font size may be increased and the spacing of characters (i.e., the tracking) may be adjusted to spread the characters apart for easier recognition of the individual characters by the reader. The tracking may also be adjusted within the focused line to reduce the spacing between words other that the focused word so that the increase in size/spacing does not cause the focused line to exceed the display area of the e-reader. In various aspects, all kerns may be eliminated by the highlighter 130 when presenting the focused word so that characters comprising the word do not overlap.

In an optional aspect, a reader may specify for multiple words to be selected by the word selector 120 at one time and be highlighted by the highlighter 130. For example, the word prior to or after the current word receiving focus in the reading order of the text may be requested to receive a subordinate focus to direct the reader's vision in the reading order of the text. For example a reader whose native language reads left to right, may desire a subordinate focus on the next word in the word order when learning a language that reads right to left or in a section of text that reads in a different reading order than the rest of the text (e.g., a quote in Hebrew or Arabic within an English text). The word(s) having subordinate focus may be provided with a lower contrast than the word having primary focus, but greater contrast than the focused line or other lines of the text. In another example, a reader who is training to speed read may request for multiple focused words at a single time so that the word selector 120 chooses two or more words at a time for the highlighter 130 to provide for focus.

The line formatter 140 is an optional component and may be used when the text selection for presentation is not formatted into lines or needs to be reformatted. For example, a text selection may be received from a productivity application that formats text into lines, but is to be presented to the reader in a reading mode that is separate from an editing mode for the productivity application, which realigns, resizes, and reformats the text for improved readability. The line formatter 140 in this example may determine an amount of screen real estate available to present text, a justification style for the text, a font size of the text, a typeface for the text and use these inputs to determine how many words may be displayed in a given line and print sets the text accordingly. The line formatter 140 identifies the lines into which the text is set so that the highlighter 130 can identify the line to which the word receiving focus belongs.

The parser 150 is operable to build an index of metadata for effects to apply to the words of the text and works in conjunction with the text enhancer 160 to apply those effects to the text. Text effects may be selected by a reader to identify words having various properties or to provide additional detail for the words.

For example, part of speech identification may be an effect that identifies words that are a selected part of speech or component of a sentence. For example, the parser 150 may look for words that are nouns, verbs (or a given case thereof), adjectives, adverbs, conjunctions, pre/postpositions, articles, include prefixes/suffixes, are the subject, are the object, etc. The parser 150 identifies the words and their part of speech based on the clause that the word belongs to, such that, for example, the word "jump" may be classified as a noun or a verb depending on its position in the clause and the presence of other words (such as "a" or "the") in proximity to the word in the clause. The parser 150 may also identify words of interest that are present in or absent from a dictionary, such as, for example, vocabulary words for a class or a test, or words deemed "difficult" (e.g., those words not present in a "simple words" dictionary). The reader may specify one or more dictionaries and/or parts of speech to identify for words of interest in the text.

When the parts of speech have been determined for individual words, the parser 150 is operable (in some aspects) to create sentence diagram information as additional part of speech metatext for display in a comprehension mode during readback. The parser 150 may construct a constituency tree or a dependency tree (or a hybrid tree) based on the parts of speech and the order of the associated words in a sentence to identify: subjects, objects (direct, indirect, reflexive), verbs, predicates, modifiers, determiners, conjunctions, noun phrases, verb phrases, prepositional phrases, clauses (independent, dependent, subordinate).

In another aspect, the parser 150 may also determine the syllables comprising each word and note the syllabication of the word (e.g., where syllables begin and end). The parser 150 may use the syllables to create or locate a vocalization for the word (e.g., as a new audio file or in an existing audio file) that may be played back in conjunction with the readback and synchronized to the readback of the text. In other aspects, the syllabication is not matched to an audio file, but is produced to allow the e-reader to create vocalizations on-the-fly during readback.

The parser 150 organizes its results in an index based on the words of the text so that each word is associated with its syllabication, part of speech (including sentence diagram information, if available), and whether the given word is a word of interest (and for what reason). The index is provided to the text enhancer 160 to implement text effects requested by the reader.

The text enhancer 160 in various aspects is operable to apply the text effects requested by the reader to words and text not given focus by the highlighter 130, only to those words and text given focus by the highlighter 130, or to words and text that are given focus and not given focus by the highlighter 130. For example, indicia of syllables may only be provided when the word is given focus, but indicia for parts of speech are only given while the words do not have focus, and indicia for words of interest are given when the words have focus and then they do not have focus.

Indicia for various words or groups of words may be provided by the text enhancer 160 as an additional chroma for the words (e.g., words of a particular class are shown in a different color than words not of that class), with additional characters (including one or more space characters) or symbols inline with the word (e.g., words of a particular class are preceded, followed, or surrounded by a certain characters or symbols, symbols are presented between syllables, a strikethrough effect is applied as a word is vocalized), or with characters or symbols above or below the word (e.g., ruby text, underlines, overlines). For example, the words comprising a subordinate clause may be set off from an independent clause with additional spaces, shown with braces around the first word (an open brace before) and the last word (a close brace after), or with an added chroma. The reader may adjust which text effects are provided for which classes of interest, and whether the text enhancer 160 applies a given text effect for a given class of words.

In aspects where the text enhancer 160 applies an effect in conjunction with the focus provided by the highlighter 130, the highlighting or (lowlighting) may be provided to the indicia. For example, when verbs are to be displayed with a red font color in the text, they may be shown with a higher or lower luminance based on whether they are part of a line or word receiving focus from the highlighter 130 as a dark red or a light red respectively. In another example, when a word with focus is presented with character/symbol indicia (e.g., a dot between syllables indicating how the word is broken into syllables, ruby pronunciation guides, ruby definitions) those indicia may be included or excluded from the text box of the highlighted word and may be displayed with the luminance of the focused word or at a lower luminance.

FIGS. 2A-H illustrate example screenshots from the graphical user interface of an application used for immersive reading. In the example screenshots, text is shown broken into lines, which may be further divided into words. The text may be pre-broken into lines by an authoring, productivity, or reading application, or may be displayed in a reading mode and broken into lines depending on the number of words that can be displayed in a line by the e-reader based on a reader-definable font size, intra-character tracking for the text, a justification setting, an orphan control/hyphenation setting, and the displayable area on the e-reader (including its orientation). In the illustrated examples, the text 220 which has been selected for display is "The quick brown Fox jumps over the lazy Dog.", and it has been divided for display into three lines, each comprising three words.

Figure 2A:
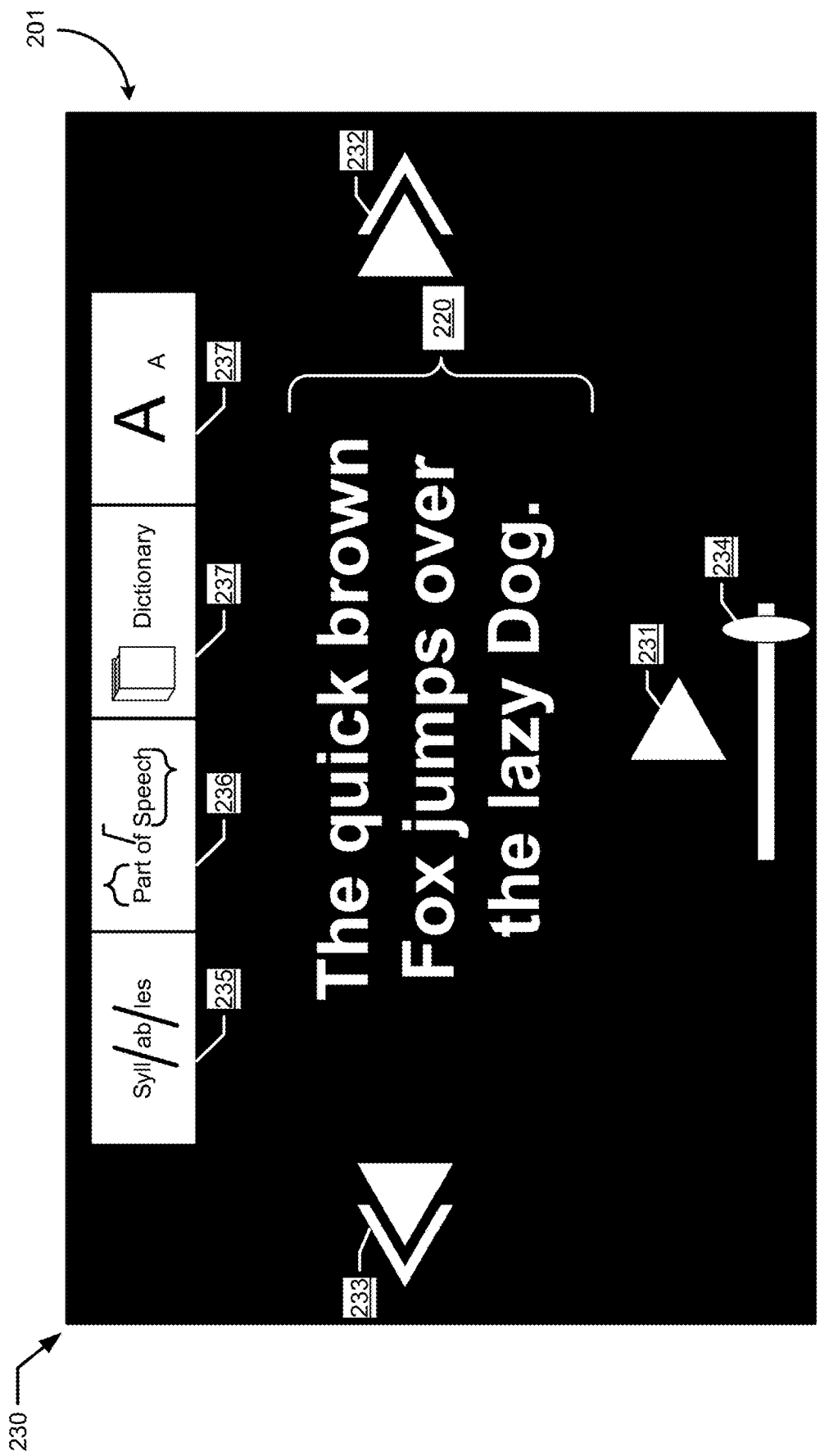
FIGS. 2A-H illustrate example screenshots from the graphical user interface of an application used for immersive reading.

FIG. 2A shows a UI 201 of a canvas 210 including the text 220 along with various readback controls 230. A readback play/pause control 231 allows the reader to initiate or pause the enhanced contrast readback of the text 220, which is shown in greater detail in regard to FIGS. 2B and 2C. An advance paddle 232 and a retreat paddle 233 allow the reader to move to a next selection or a previous selection of the text 220 in a document (e.g., a next/previous page, slide, textbox etc.). A readback speed adjustor 234 allows the reader to increase or decrease the speed at which words are presented during readback, which may be influenced by the number of syllables comprising a word, punctuation related to the word (e.g., a comma, semi-colon, colon, period, question mark, m-dash, n-dash, slash, quotation mark, parenthesis, bracket) or a duration of a vocalization associated with the word (which may in turn be affected by punctuation). A syllabication control 235 allows the reader to request syllable indicia 240 for syllables comprising words to be displayed (either for an active word 270 or all words), which is shown in greater detail in regard to FIG. 2D. A part of speech control 236 allows the reader to request part of speech indicia 240 for a given part of speech to be displayed (either for an active word 270 or all words), which is shown in greater detail in regard to FIG. 2E. A word help control 237 allows the reader to request that metatext (e.g., spelling suggestions, usage statistics, synonyms, definitions), be presented along with the active word 270 or selected words in the text which is discussed in greater detail in regard to FIG. 2F. A sizing control 238 allows the reader to request the active word 270 or all words to be displayed at a different font size or a different kerning/tracking, which is discussed in greater detail in regard to FIGS. 2G and 2H. As will be appreciated, other controls 230 may be provided to the reader, and the above listed controls 230 are provided as non-limiting examples.

As will be appreciated, although FIGS. 2A-H are presented in black and white, showing the greatest contrast between black and white and lesser contrasts between black and gray, white and gray, and various shades of gray, the contrasts between the various texts and backgrounds may be implemented using colors with chrominances beyond the monochromatic examples and the luminances of the examples may be reversed (e.g., light text on dark backgrounds or vice versa). For example, the text color of the characters comprising the active line 260 may be bright red, the text color of the characters comprising inactive lines 250 may be dark red, the background color of the text may be dark blue, and the background of the text box of the active word 270 may be bright blue. In some aspects, chroma are applied as indicia for various words of interest (e.g., for parts of speech, difficult words, vocabulary words), in addition to the contrasting luminances. For example, a more or less vivid shade of a given color used as an indicator may be applied when a given word is focused on or not focused on as the active word 270 or part of the active line 260.

Figure 2B:
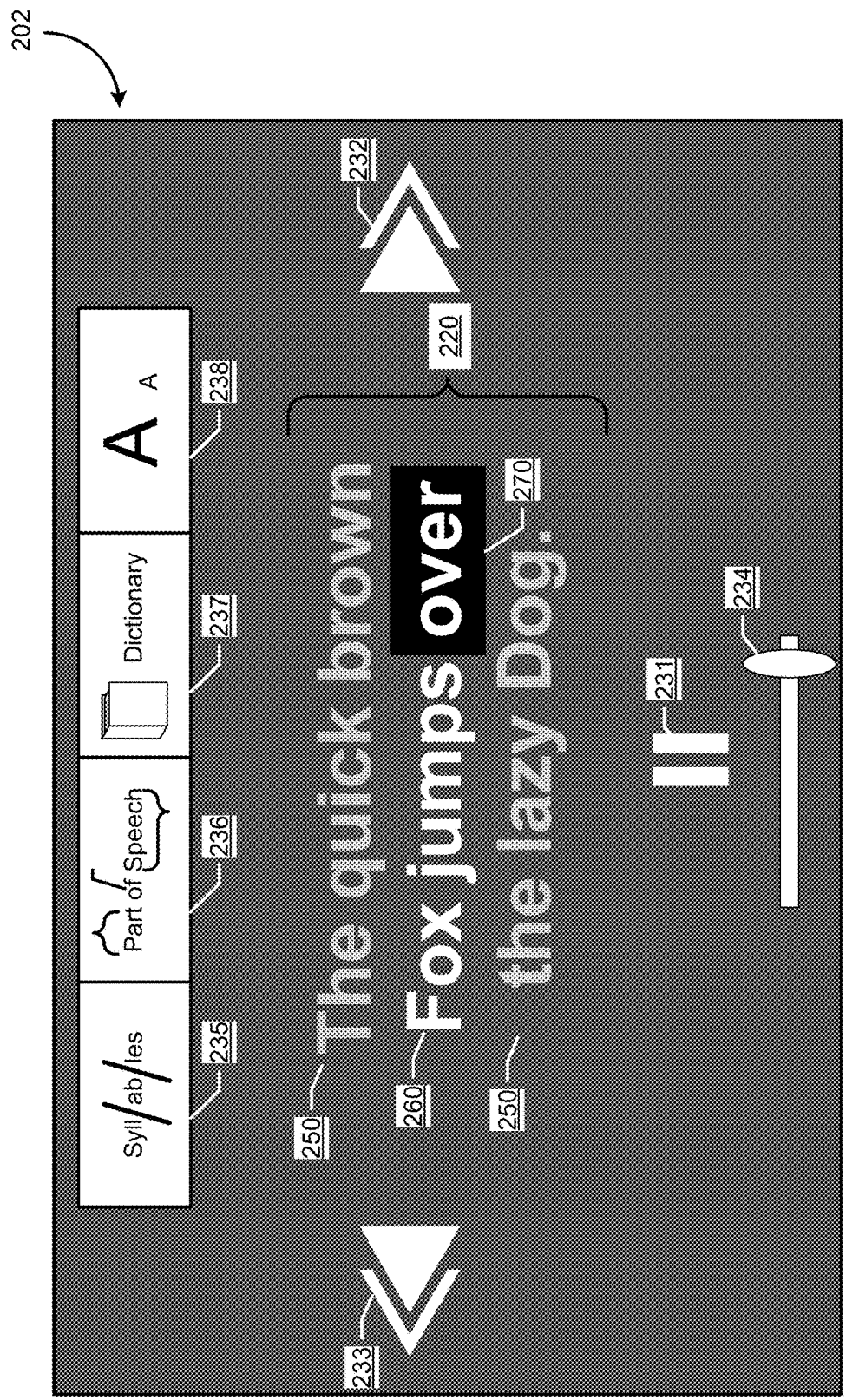
Figure 2C:
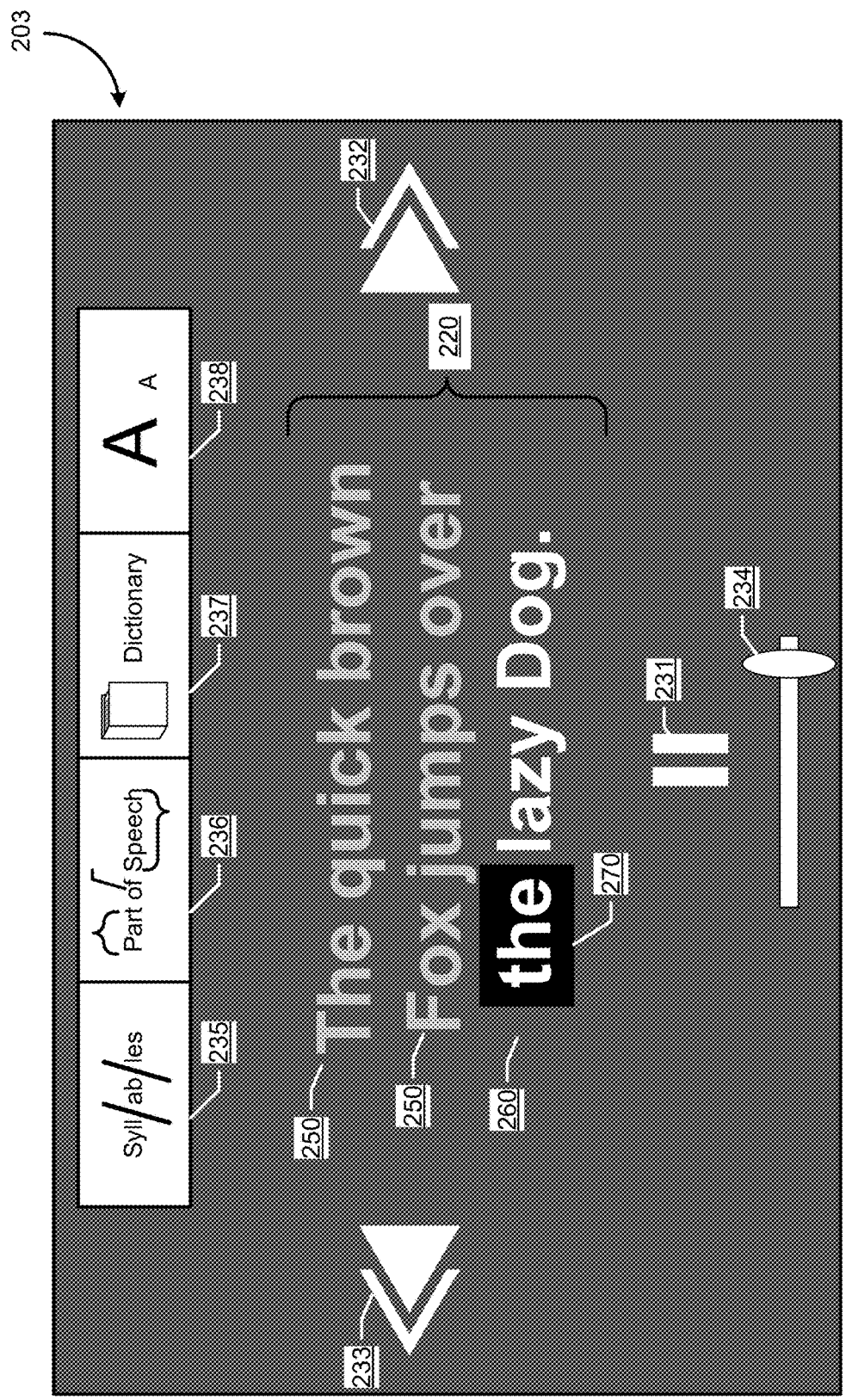

FIGS. 2B and 2C illustrate example UIs 202 and 203 demonstrating enhanced contrast readback progressing from a first selected word to a next word as the active word 270. In FIG. 2B, the active word 270 is illustrated as "over" and the active line 260 (being the line that the active word 270 belongs to) is "Fox jumps over". FIG. 2C illustrates a progression in readback from FIG. 2B, where the active word 270 is illustrated as "the" and the active line 260 (being the line that the active word 270 belongs to) is "the lazy Dog.". During readback, the immersion reading environment 100 will select a word to present to which the reader's attention should be drawn as the active word 270 and will determine that active line 260 to which the active word 270 belongs; all other lines are treated as inactive lines 260. The active word 270 will be displayed with greater contrast than the other words of the text 220 for a period of time (based on the readback pace set by the readback speed adjustor 234 and affected by the complexity of the given word, proximate punctuation, and/or a duration of a vocalization for that word) and the next word from the text 220 will then be selected as the active word 270; returning the original word to a lower contrast display and increasing the contrast of the new active word 270. Similarly, when the new active word 270 is on a different line than the previous active word 270 (as is illustrated for FIGS. 2B and 2C), the old active line 260 will become an inactive line 250 and the new active line 260 may have its display properties modified.

The display properties for the text in the GUI of the e-reader are modified to provide a greatest contrast between content and its background for the active word 270. The content/background contrast for the active line 270 has a next greatest contrast, and inactive lines 280 will have a lower contrast. In some aspects, each inactive line 250 may be set to a minimum contrast that is still readable by the reader, while in other aspects, the inactive lines 250 have progressively lower contrasts as their distance from the active line 260 increases; fading out of view as the inactive lines 250 are closer to the active line 260.

When the active word 270 is the last word in a section of text, readback may conclude, restart from the beginning of the section, automatically proceed to a next section of text (e.g., a next page, text box, slide) or wait for input from the reader to determine what action to take next.

Figure 2D:
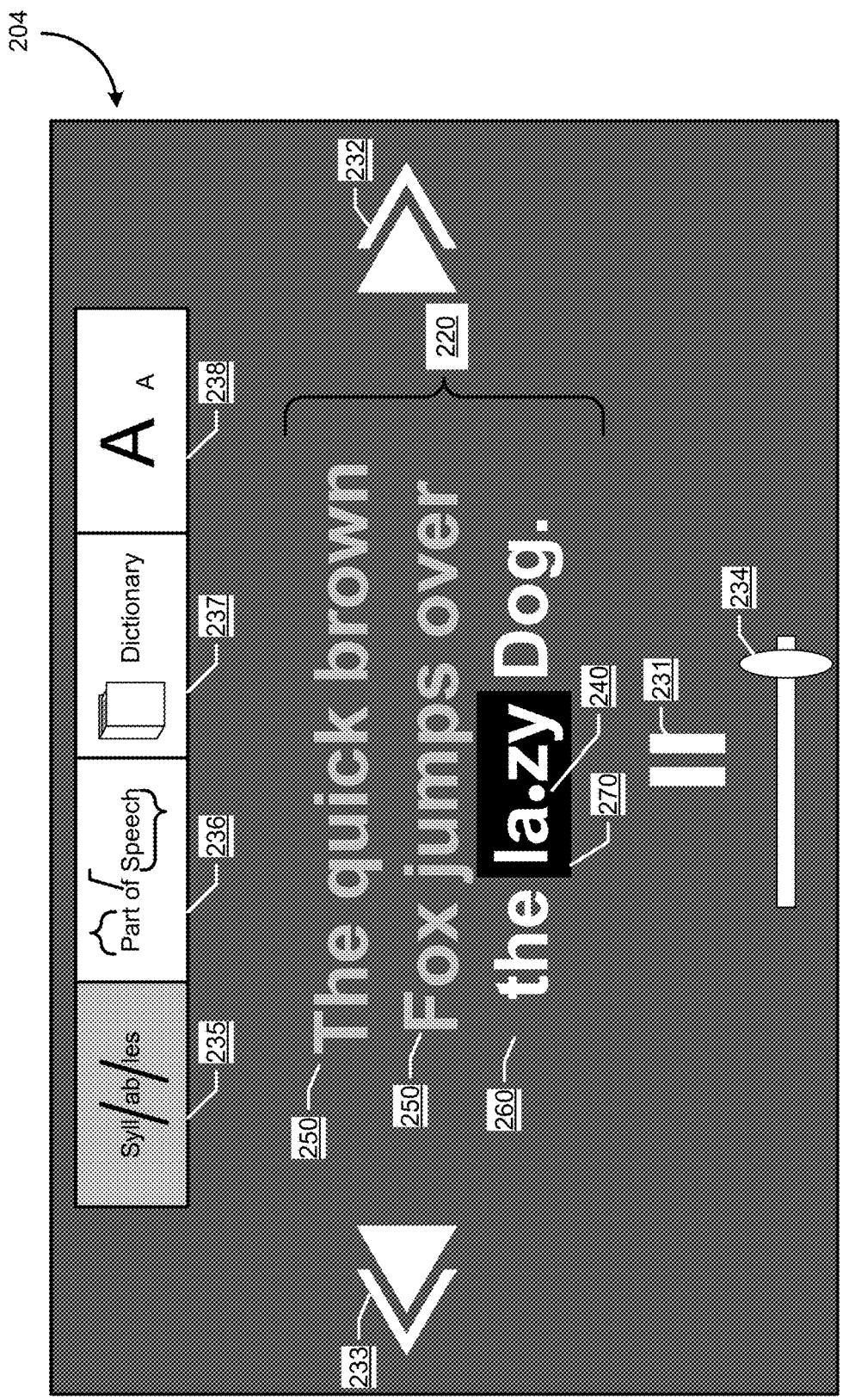

FIG. 2D illustrates an example UI 204 when a syllabication control 235 has been selected by the reader. As part of parsing and examining the text 220 to enhance its presentation in the UI 204, each word may be broken into its component syllables. In various aspects, when a word contains multiple syllables a spacer or a syllabication indicium 240 (e.g., a space character, an underline character, a bullet character) may be placed between each set of syllables to alert the reader as to how the word is broken into syllables. In other aspects, each syllable may be shown in a different color as its indicium 240, and each color may be associated with a tone or stress to place on that syllable when it is pronounced. As is illustrated, the word "lazy" has been broken into the syllables of "la" and "zy" with a bullet character between each of the multiple syllables, and first syllable may be shown in red (indicating that it is to be stressed) and the second syllable may be shown in blue (indicating that it is not to be stressed). Various rules may provide that words of less than n syllables (e.g., less than three syllables, four syllables, etc.) or that do not appear in a dictionary defining words of interest do not undergo syllabication although otherwise eligible.

Additionally, FIG. 2D illustrates a text enhancement that is only applied to the active word 270. As will be appreciated, in the illustrated example the word "over" is also comprised of multiple syllables and may be associated with indicia 240 for syllabication, but is not. In the present example, if "over" were the active word 270 instead of "lazy", "lazy" would be displayed without syllabication indicia 240 and "over" would be displayed with the appropriate indicia 240. Whether a given text effect is applied only to the active word 270 may be set by the reader or by a developer of the application used to present the text 220 via the e-reader.

Figure 2E:
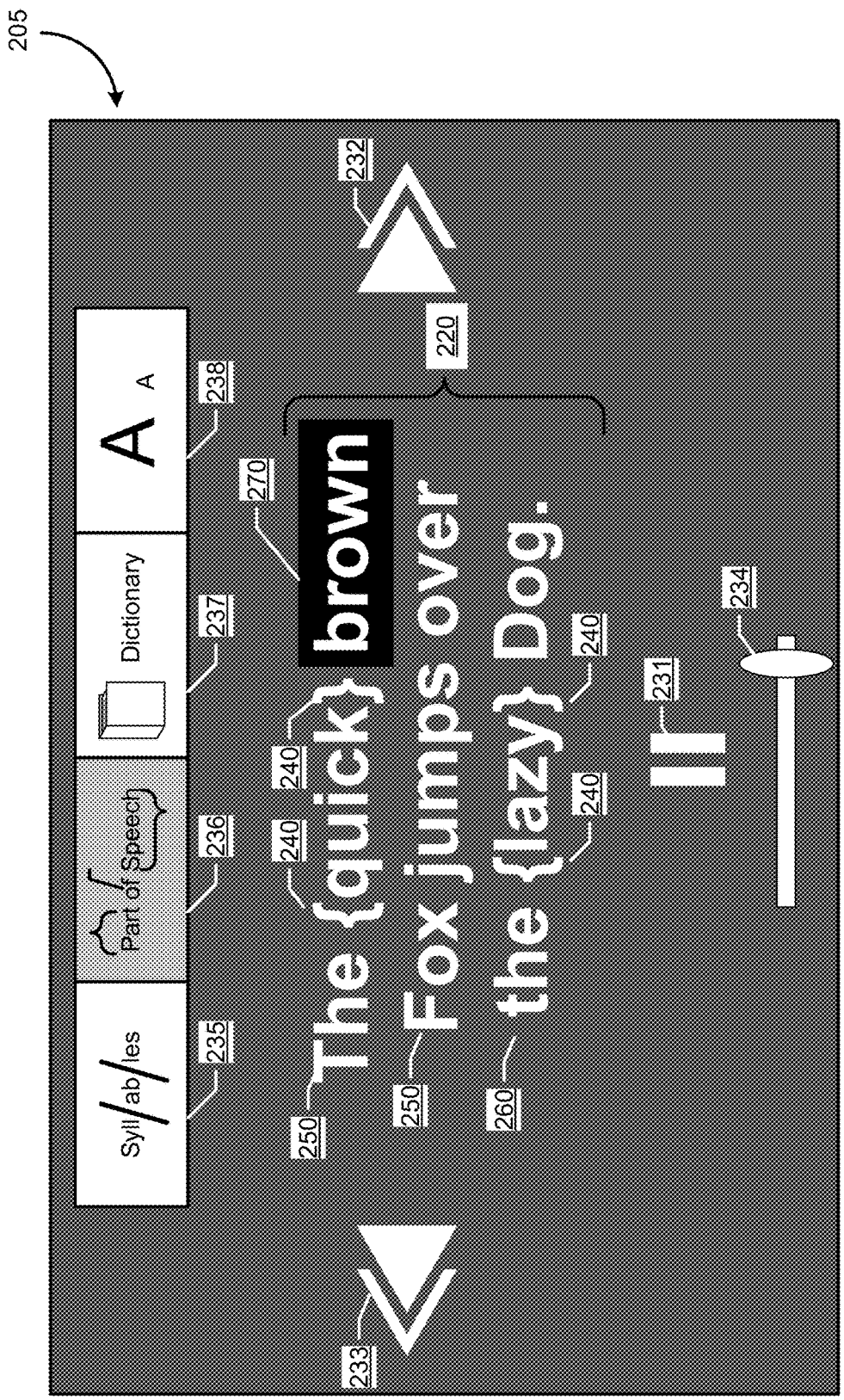

FIG. 2E illustrates an example UI 205 when a part of speech control 236 has been selected by the reader. As part of parsing and examining the text 220 to enhance its presentation in the UI 205, each sentence and word may be broken into its component parts of speech. The reader may specify various parts of speech that are to be highlighted and the indicia 240 that are to be used to highlight those parts of speech. As illustrated in FIG. 2E, the reader has selected for adjectives to be highlighted by framing the words that are adjectives in braces (i.e., "{" and "}"). In other aspects, different symbols (e.g., chevrons) text formats (e.g., underlines), or colors (e.g., most of the text 220 is gray/white, but the indicia 240 apply a red chroma) may be applied to identify parts of speech to the reader.

Additionally, FIG. 2E illustrates a text enhancement that is only applied to words other than the active word 270. As will be appreciated, in the illustrated example the word "brown" is also an adjective and may be associated with indicia 240 for parts of speech that are adjectives, but is not. In the present example, if "brown" were not the active word 270, "brown" would be displayed with part of speech indicia 240. The highlighter 130 may "un-apply" the indicia 240 to the active word 270, or in highlighting the active word 270 may omit or overwrite any active text effect or formatting. Whether a given text effect is applied only to words other than the active word 270 may be set by the reader or by a developer of the application used to present the text 220 via the e-reader.

Figure 2F:
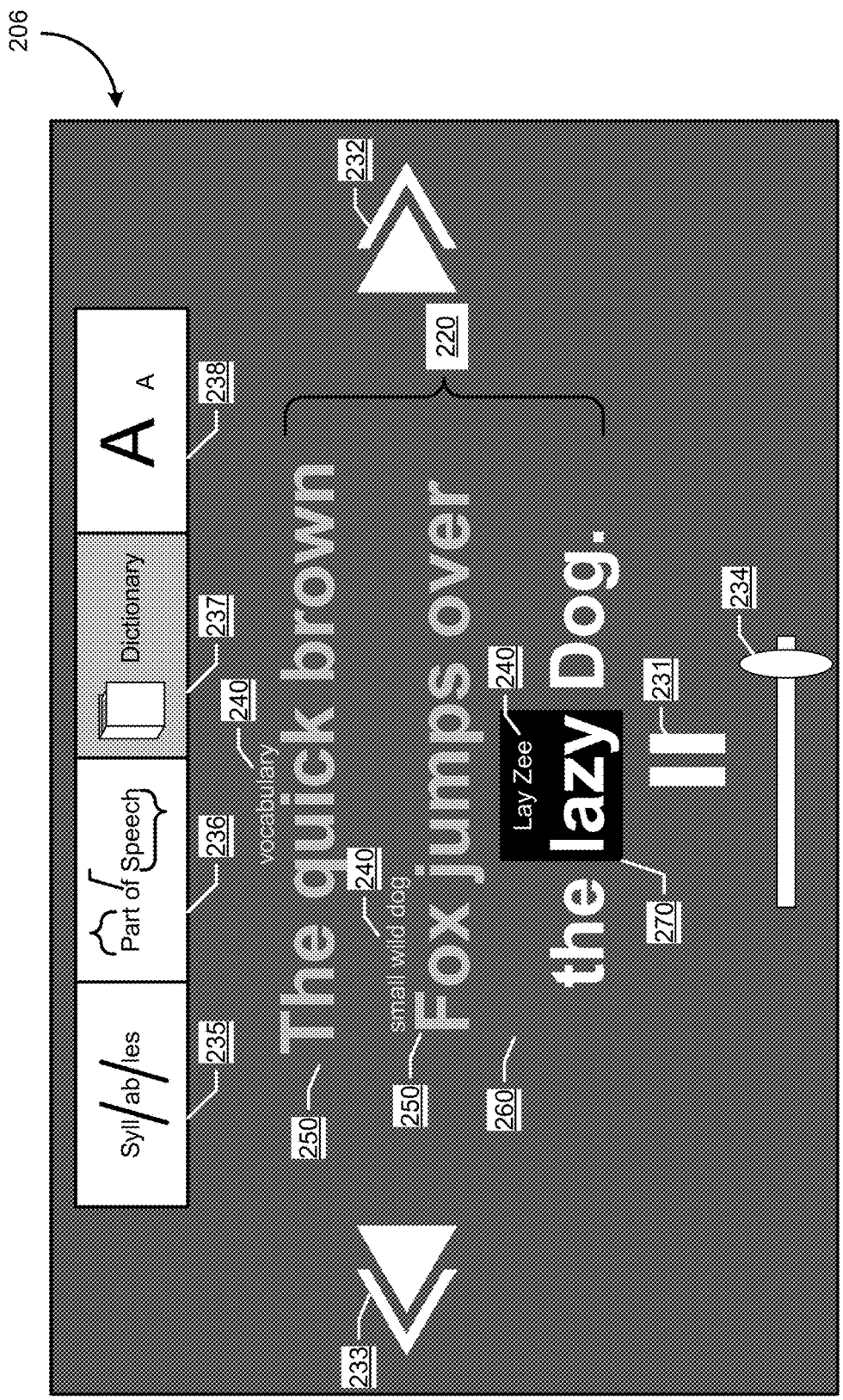

FIG. 2F illustrates an example UI 206 when a word help control 237 has been selected by the reader. As part of parsing and examining the text 220 to enhance its presentation in the UI 206, each word may be compared to one or more dictionaries to provide metatext to the reader to call out words of interest or additional information about a given word. In various aspect, the metatext indicia 240 may be presented as ruby text (above or below) a given word, a particular color (e.g., words found in a dictionary defining vocabulary words may be presented in a particular color), or a font format (e.g., words that are defined as overused in a text selection may be presented as italicized, underlined, or with a strikethrough). Additionally, the metatext may affect a readback pace, so that, for example, a vocabulary word or a word identified as misspelled may be presented as the active word 270 for longer than it would be presented otherwise. In the illustrated example, ruby metatext indicia 240 identifying the word "quick" as a vocabulary word, providing a definition for the word "Fox", and providing pronunciation guides for the word "lazy" are shown.

Additionally, FIG. 2F illustrates a text enhancement that is applied to words regardless of their status as the active word 270. As will be appreciated, in the illustrated example the words "quick", "Fox", and "lazy" are all associated with indicia 240 for metatext found in different dictionaries (vocabulary, definitions, pronunciations). Dictionaries may be set by the readers and may include predefined dictionaries included in the application providing readback (e.g., a spellchecking dictionary), pre-defined external dictionaries from other applications (e.g., an online dictionary, a dictionary application), reader-defined document dictionaries (e.g., a document specifying vocabulary words for a class), and may include textual entries and graphical entries (e.g., the metatext for "implosion" may be a text definition and/or an animated or still image/video of an object imploding). Which metatext is shown when multiple are available may be chosen by the reader's preference, and whether a given text effect is applied only to words regardless of their status as an active word 270 may be set by the reader or by a developer of the application used to present the text 220 via the e-reader.

Although FIGS. 2D-2F discuss many types of indicia 240 that may be applied to individual text effects, the e-reader may allow for multiple text effect indicia 240 to be layered and presented at the same time. For example, the syllabication indicia 240 of FIG. 2D could be combined with the ruby metatext indicia 240 of FIG. 2F to show a reader how the individual syllables are pronounced. As will be appreciated, however, the e-reader may prevent a reader from selecting interfering or overlapping indicia 240, such as, for example, if a reader were to request a given part of speech to be displayed with a specific color, the reader would be prevented from displaying any color indicia 240 for other text effects or using the specific color for other text effects.

Figure 2G:
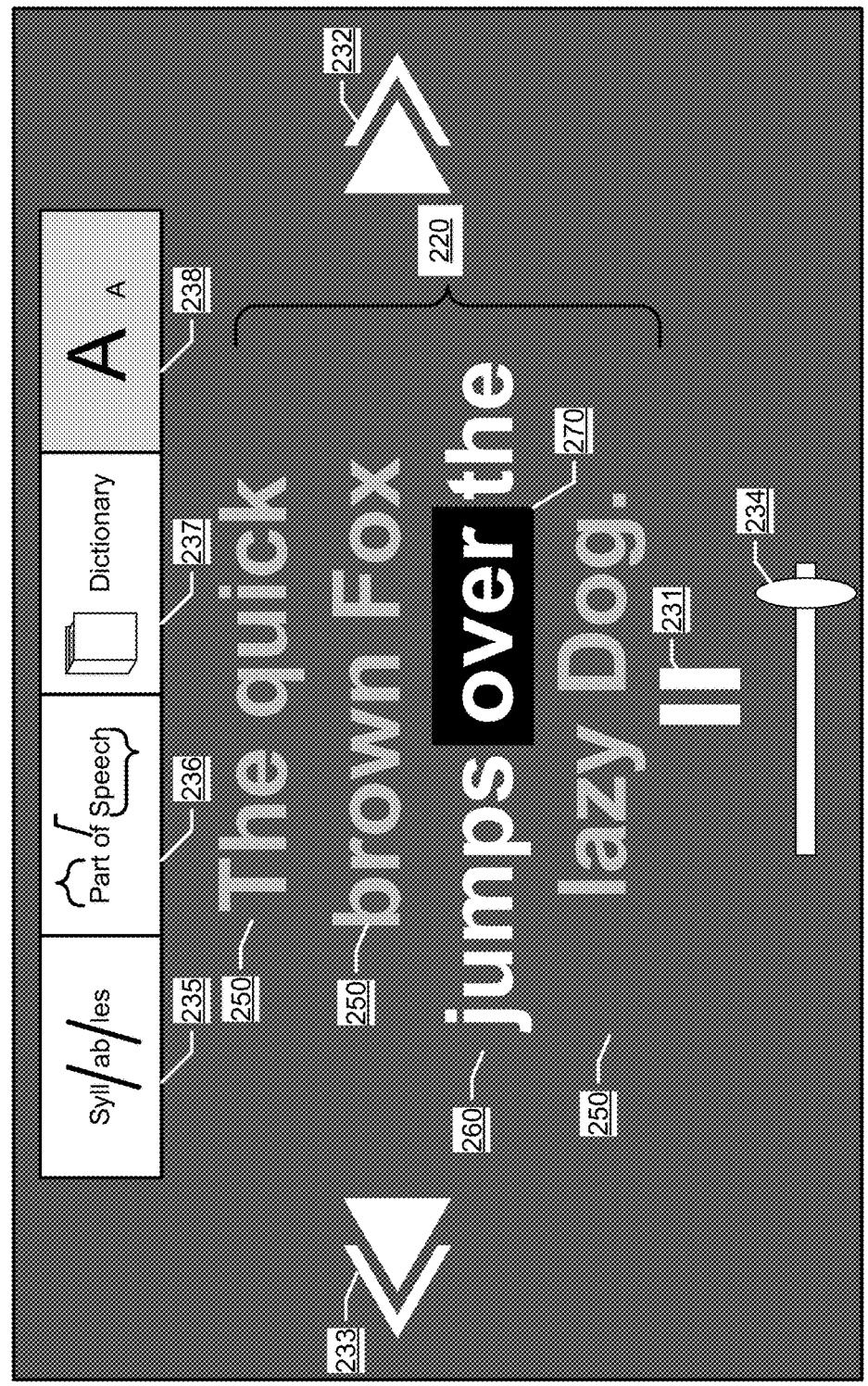
Figure 2H:
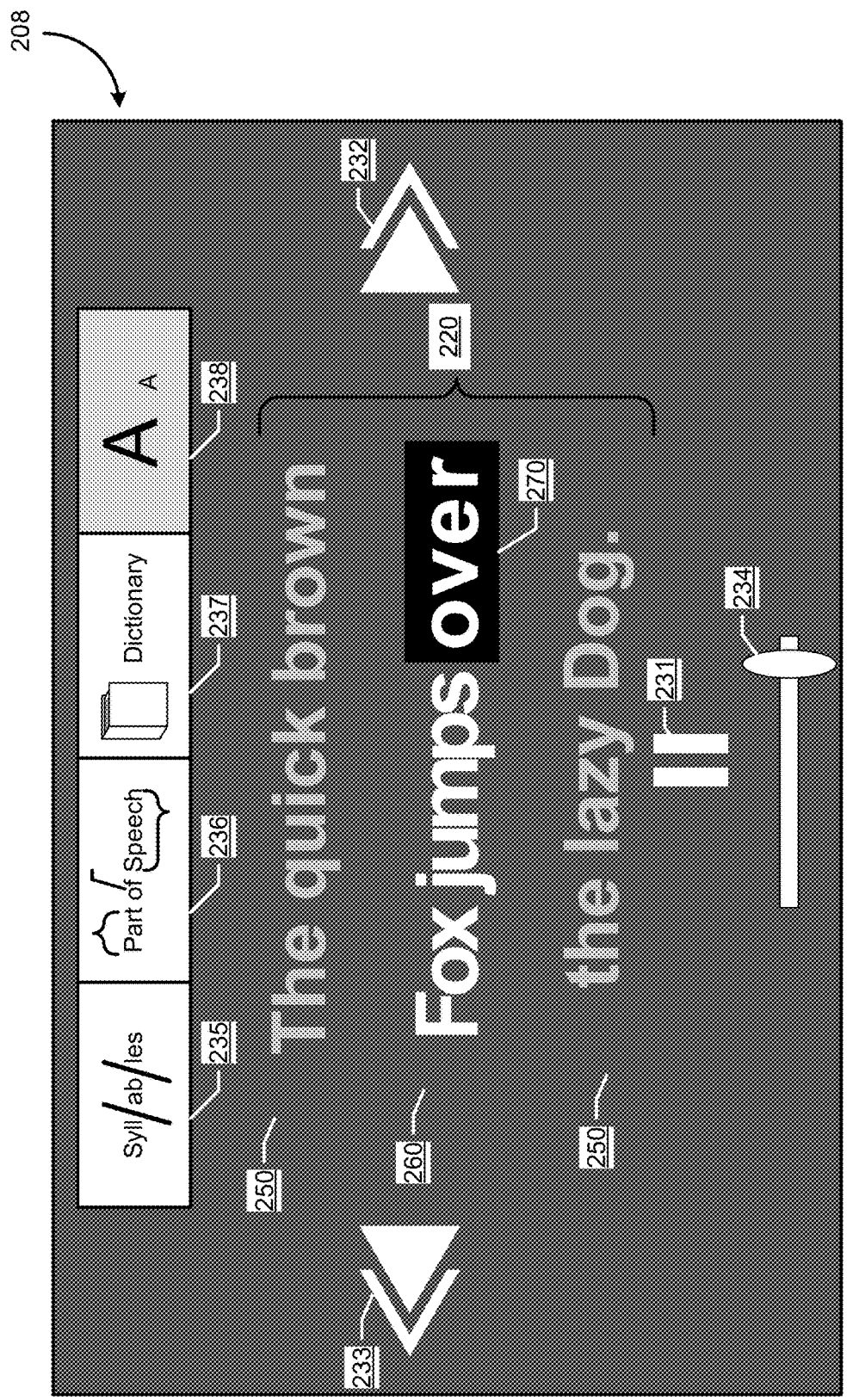

FIGS. 2G and 2H illustrate example UI 207 and UI 208 respectively when a sizing control 238 has been selected by the reader. The example UI 207 shows that the size of the text 220 has been increased in response to the selection of the sizing control 308, while the example UI 208 shows that the size and tracking of the active line 207 has been adjusted but not (or to a lesser extent) the inactive lines 250. FIG. 2G shows that when the size of the characters is adjusted that the division of the text into lines may need to be reevaluated, while FIG. 2H demonstrates how larger text and words with greater intra-word spacing of characters may be fit into the original line divisions.

To fit larger and greater spaced words into the same line structure, the GUI may be updated to only affect the active line 260 with a font resizing, and the tracking of the words other than the active word 270 in the active line 260 may be moved closer together. The tracking of characters comprising a line or selection of text defines how closely they are spaced together, and the active line 260 may be displayed with a greater space between characters than inactive lines 250 to improve its readability or may be presented with less space between its characters so that even greater spacing between characters may be provided to the active word 270. Tracking may be provided evenly over a range of words or individual words' character spacings may be adjusted unevenly to account for a typeface's available spaces between letters and the shapes of those letters. In some aspects, the characters of the active word 270 are spaced to eliminate kerns for the characters (i.e., no character overlaps into the whitespace of another character).

In various aspects, when providing readback, the immersion reading environment 100 may maintain the active line 270 at the same relative position on the e-reader's display, scrolling new lines into the position when the active word 280 moves to a new line, or the active line 270 may maintain its absolute position on the display (except when the reader scrolls or a new section is reached).

Figure 3:
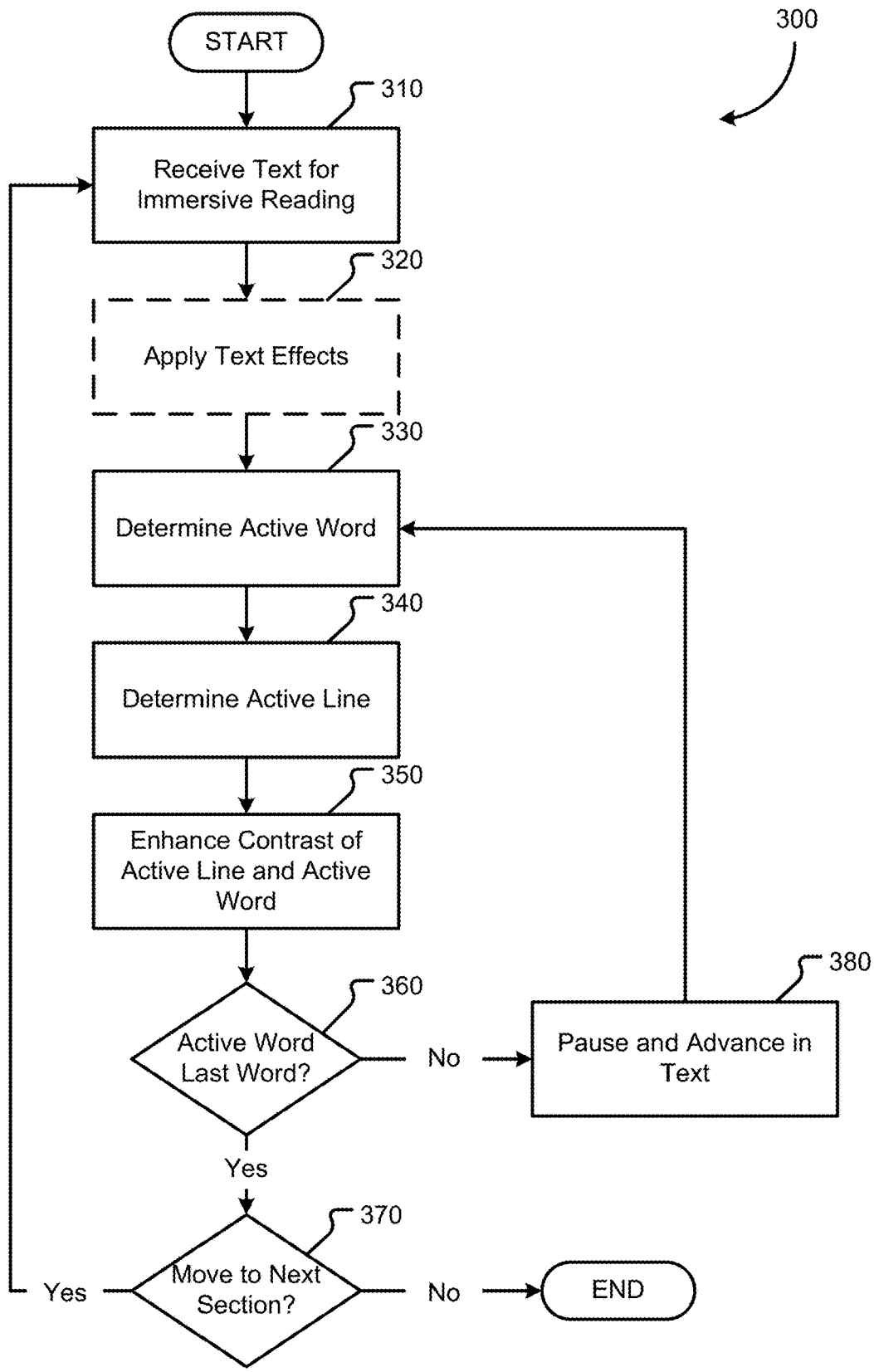
FIG. 3 is a flow chart showing general stages involved in an example method for improving functionality and efficiency of an electronic reading device.

FIG. 3 is a flow chart showing general stages involved in an example method 300 for improving functionality and efficiency of an electronic reading device. Method 300 begins at OPERATION 310 when a reader signals that a selection of text is to be presented for immersive reading. In various aspects, the text may be received as already broken into lines and words, or a line formatter 140 may be used to break the text into lines that can be displayed on the e-reader (based on a size and tracking of the characters on each line, a screen size/orientation, etc.) and each lines into its component words (e.g., via space delineation, word recognition).

At OPERATION 320, optional text effects may be applied to the text 220. Individual sub-operations of OPERATION 320 are discussed in greater detail in regard to FIG. 4. The application of these text effects may be applied before or in addition to highlighting of active words 270 and active lines 260, and OPERATION 320 may be performed (or undone) as a sub-operation of OPERATION 350 or in conjunction with OPERATION 350 per reader preferences.

Proceeding to OPERATION 330, an active word 270 in the text 220 is determined based on the reader's position in the text 220. When a reader initially submits the text, the reader's position may be the first word in the text selection or a bookmark in the text selection, but a reader may also use a touchscreen or pointing device to select a different position in the text 220. The active line 260, being the line in the text 220 to which the active word 270 belongs, is determined at OPERATION 340.

At OPERATION 350, the contrast of the active word 270 and the active line 260 are enhanced relative to the rest of the text 220. To enhance the active word 270 and/or the active line 260, the contrast between the text and its background is adjusted. This may involve increasing the contrast for the active word 270 and/or active line 260, decreasing the contrast for the other words and lines, or a combination of the two. For example, two text colors and two background colors may be applied to define different contrasts (based on a difference in the luminances between the colors). A contrast between the active word 270 and the background of its bounding box (the area surrounding the active word 270 and (optionally) its text effects) will define a greatest contrast; a largest difference in luminaces for text and background colors. The contrast between the other words of the active line 260 and their backgrounds may be less than, may be greater than, or may be equal to the contrast between the inactive lines and their backgrounds, but both of their contrasts will be defined by differences in luminance less than those for the active word 270 and its background.

In one aspect, the highlighter 130 applies a new text and background color to the inactive lines, and will apply one of the new colors to the words or background of the active line 260. For example, when the text 220 is normally displayed with black text on a white background, the background color for the inactive lines will be changed to light gray, the text color for the inactive lines will be changed to dark gray (reducing the contrast), the text color for the active line 260 will be changed to dark gray (or, alternatively, the background color changed to light gray), and the white/black colors for the active word 270 will remain unchanged. It will be appreciated that the application of colors may be performed in reverse of the above example; increasing the contrast of the active words/lines instead of decreasing the contrast of the inactive words/lines.

When enhancing the contrast of the words and lines to be afforded greater focuses by the reader, different text effects and font formats may be changed to improve the readability and capture the reader's vision. For example, italic, bold, underline, sub/superscript and other font formats may be removed when the active word is enhanced in OPERATION 350. Similarly, link indicia (identifiers for footnotes, endnotes, hyperlinks) may be removed from the active word 270. The kerning of the active word 270 and the tracking of the active line 260 (or individual kernings) may be altered, as well as the font size to improve the readability of the active selections. Moreover, accent marks may be displayed as larger for the active selections than the inactive portions of the text.

OPERATION 350 may incorporate or remove various additional text effects. For example, while the active word 270 is highlighted as part of OPERATION 350, a vocalization may be played back and/or the syllabication of the word may be displayed when it was not previously displayed for the word while inactive (e.g., displaying "example" as "ex●am●ple"). In an alternate example, the text effects for inactive words may be overridden when they are highlighted, such that, for example, when a word is displayed when inactive with a ruby text defining the word may be displayed without the ruby text when it is the active word 270. In yet another example, when the indicia for a word of interest applies a chrominance to the text (or background), the highlighting of active words 270 may incorporate that chrominance along with the adjustments to luminance, such that, for example, a word displayed in red text against a white background to indicate that it is of interest (e.g., a given part of speech, part of a vocabulary list, a foreign loan word, misspelled) may be displayed as a lighter or darker shade of red depending on whether it is part of the active line 260 or is the active word 270 (retaining its chrominance, but adjusting its luminance).

At DECISION 360 it is determined whether the reader's position is at the last word in the text 220. When the reader's position is the last word in the text 220, method 300 proceeds to DECISION 370, where method 300 may return to OPERATION 310 if the reader signals that the method may proceed with the next section of the text 220 or may conclude if there is no next section of text or the reader has not signaled to proceed to the next section. Alternatively, method 300 may, automatically or based on a command from the reader, return to OPERATION 310 from DECISION 370 to repeat method 300 with the current section of text.

When it is determined at DECISION 360 that the reader's position was not the last word in the text 220, method 300 proceeds to OPERATION 380. At OPERATION 380 the readback is paused based on a readback pace specified by the reader, among other factors, and at the conclusion of the pause, the reader's position in the text 220 is advanced to the next word. Method 300 then returns to OPERATION 330 for the next word to be selected as the active word 270 to continue readback.

As will be appreciated, the pause in OPERATION 380 may be manually implemented by the reader (e.g., via a play/pause command, until receiving an advance command) or automatic based on a pace specified by the reader. The pace may be defined as "words per minute," but may also be influenced by: a number of syllables or letters comprising the word, a duration of a vocalization associated with the word, whether the word has been identified as "easy" or "difficult" according to a dictionary or rules, etc.

Figure 4:
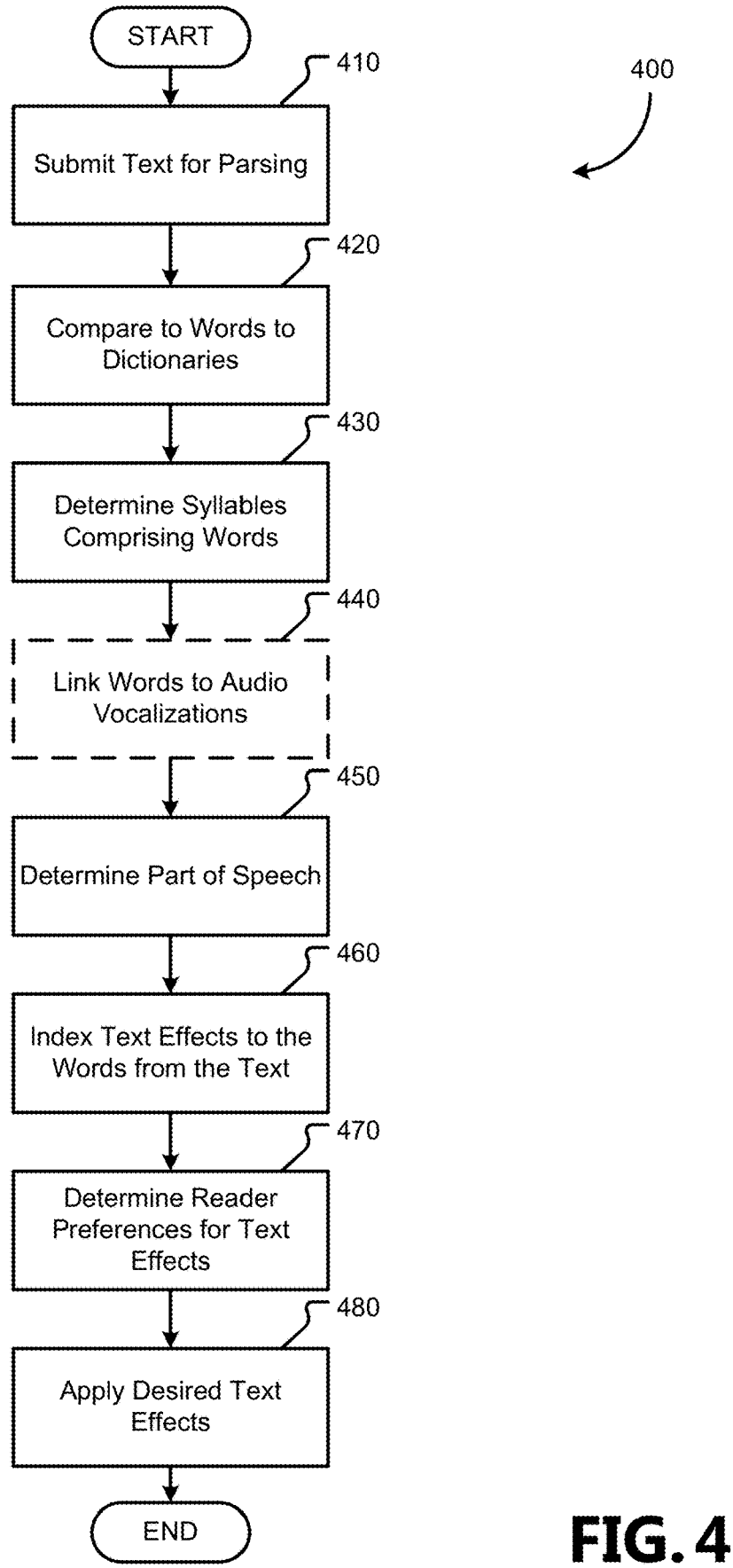
FIG. 4 is a flow chart showing general stages involved in an example method to apply text effects.

FIG. 4 is a flow chart showing general stages involved in an example method 400 for executing OPERATION 320 from method 300, discussed in relation to FIG. 3, to apply text effects. Method 400 begins at OPERATION 410, where the text 220 is submitted for parsing. In various aspects, the text 220 may be parsed locally to the application or device used to present the text 220, or may be transmitted to an external service on the e-reader or a separate device. Each of the OPERATIONS 420-450 are part of parsing the text 220, and may be performed recursively or in orders other than that presented in FIG. 4 so that information produced from one operation may affect another operation.

At OPERATION 420, method 400 compares the parsed text to various dictionaries. As part of submitting the text for parsing, the language that the text is written in may be determined based on comparing the words against a dictionary to automatically recognized the language, alternatively settings on the e-reader, or the reader may manually specify the language(s) comprising the text. Additionally, the definitions of the parsed words, whether the words are identified as "difficult" or "easy" or are otherwise of interest to the reader (e.g., part of a vocabulary list), pronunciation guides, etc. may be determined from comparing the words to a dictionary, which may take into account the determined part of speech for the word (e.g., the word "read" may have different pronunciations based on its part of speech). A preferred pronunciation (e.g., "to-may-to" versus "to-mah-to") may be determined based on the detected language or user settings (e.g., British English versus American English versus Spanish). The words may also be compared to a spell-checking dictionary to automatically correct minor spelling errors or provide suggestions to the reader of a preferred or most-likely correct spelling for a given word.

At OPERATION 430 the syllables that comprise each of the words in the text 220 are determined. As will be appreciated, depending on the language of the text 220, how the words are broken into syllables will differ. For example, if the text 220 were written in Japanese katakana (a syllabary), a syllable may be determined to be located between each major character or character grouping (excluding ゛, ゜, ōon, sokuon, choonpu, and other functional characters), whereas if the text 220 were written in an alphabetic script, consonant vowel groupings may be identified to break a word into syllables based on construction rules for the language. For irregular words in the language, or languages without strict rules for phonetic spellings, a dictionary may be consulted for the syllabication of words.

Method 400 may optionally proceed to OPERATION 440 to link the words to audio vocalizations. In aspects where OPERATION 440 is omitted, the e-reader may use the words or the syllables determined in OPERATION 430 with a text-to-speech module to produce vocalizations, or no vocalization may be provided. The audio vocalizations may be produced for the words or the syllables at OPERATION 440, or timestamps in an existing audio file may be determined and linked to. For example, when the e-reader is providing an e-book to the reader and an associated audio book is available, OPERATION 440 may identify the times in the audio book that match to the textual words. In various aspects, a speech recognizer may map the sounds from the existing audio file to the textual words. The duration of each word's vocalization may be noted to affect the readback speed of the text so that the readback speed matches the playback speed of the audio, even if the audio is not played back to the reader, so that a readback speed may match a spoken cadence.

At OPERATION 450 the parts of speech of the words in the text 220 are determined. In various aspects, the punctuation, position in a sentence or clause, the parts of speech of other words, and the word's form (e.g., via a declension or conjugation form) may be used to determine that word's part of speech. Parts of speech may include, but are not limited to: nouns, verbs (or a given case thereof), adjectives, adverbs, conjunctions, pre/postpositions, articles, particles, prefixes/suffixes, subjects, objects (direct and indirect), interrogatives, interjections, etc.

The part of speech may be used to affect a created vocalization or a pace of playback or readback. For example, in a sentence ending with a question mark or identified as including an interrogative (e.g., who, what, where) may have a rising pitch (in languages that use rising pitch to identify a question). In another example, a level of stress may be placed on a given word's vocalization based on its position or function in a clause or the associated punctuation.

The determination of the parts of speech may be further expanded to provide a sentence comprehension mode during readback. In a sentence comprehension mode, sections of the sentences and paragraphs in which the words are presented are provided indicia 240 such that sentences may be diagramed into their clauses, verbs linked with their objects, pronouns linked with their nouns, etc. For example, ruby text indicia 240 for a pronoun of "it" may be provided to identify the noun that "it" represents. In another example, a subordinate clause may be presented with a specific chroma or with characters around the clause as indicia 240 that it is a subordinate clause. In yet another example, an object of a sentence may be presented with the same indicia 240 as its associated verb is presented with, or may have its verb presented as ruby text. In still another example, the adjectives and adverbs may be included within the character/symbol indicia 240 or may use the same chroma indicia 240 as the words that they modify. Grammatical components of a selection of text (e.g., sentence, paragraph, chapter) may be determined according to a constituency/dependency tree determined during parsing based on the parts of speech of individual words and their order within the selection of text (and a determined language for the text).

Proceeding to OPERATION 460, the results of OPERATIONS 420-450 are grouped into an index based on the given word. For example, for the text of "The quick brown fox jumps over the lazy dog," the word "over" may be indexed with a syllabication determination of two syllables ('o' and 'ver'), a vocalization for the word (and its duration), a sentence component of "predicate member," and a part of speech of "preposition." Continuing the example, the index is based on word position (e.g., $word_1$, $word_2$ $word_3$, etc.) and not the word identity, such that each of the words "the" may be indexed separately to their syllabication, vocalization, and part of speech to allow for different uses of the same word in the text selection. For example, the first "the" may be provided a vocalization with greater stress (and a longer duration) than the second "the." When the text was submitted for parsing externally from the e-reader (device or application) in OPERATION 410, the index may be returned to the e-reader from the external parser at OPERATION 460.

The reader's preferences for text effects are determined at OPERATION 470. In various aspects, a reader may specify that a given part of speech, syllabication, definitions, identified words of interest (e.g., words identified as difficult, as vocabulary words, with unusual spellings), etc. is to be identified in the text 220. The reader may also specify how the text to be identified is to be enhanced. In various aspects the indicia for various text of interest may be specified as a particular color, font format(s) (e.g., bold, underline, double underline, italic), a character or symbol marker is to be applied to the word of interest, or definitions, alerts, or pronunciation help may be provided as ruby text. In various aspects, the reader may specify that the enhancement is to be applied only when the word is the active word 270 or part of the active line 260, is to be applied when the word is not the active word 270 or part of the active line 260, or is to be applied regardless of whether the word is the active word 270 or part of the active line 260.

The indicia for words of interest are applied to the text according to the reader's preferences in OPERATION 480. In various aspects, depending on the reader's preferences for when to apply text enhancements, OPERATION 480 may be performed in conjunction or reaction to OPERATION 320 or OPERATION 350 of method 300, discussed in regard to FIG. 3. OPERATION 480 may affect the underlying text in a document from which the text was retrieved or may affect a reading mode presentation of the text 220 and leave the source text unaffected. Method 400 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
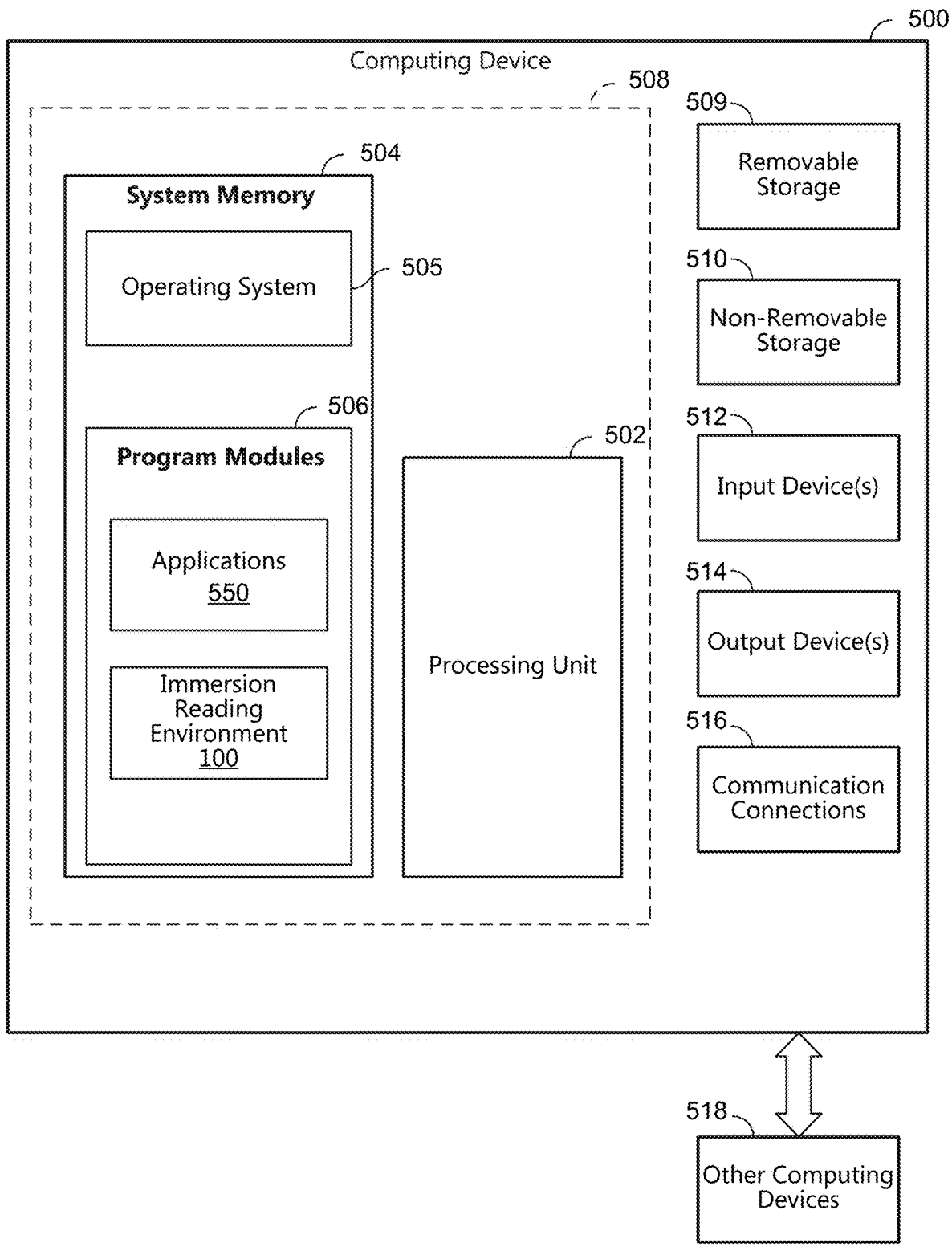
FIG. 5 is a block diagram illustrating example physical components of a computing device.
Figure 6A:
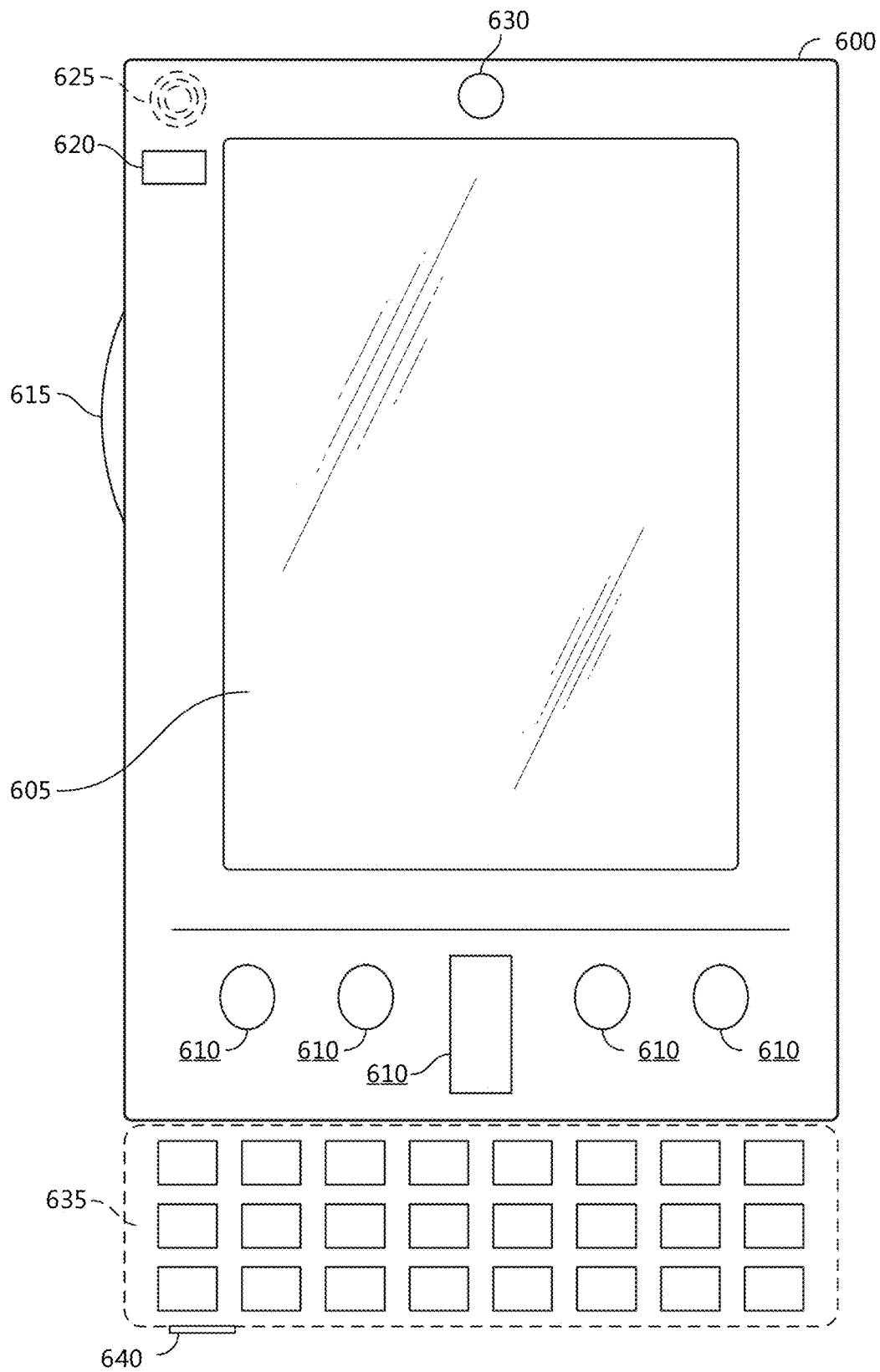
FIGS. 6A and 6B are block diagrams of a mobile computing device.
Figure 6B:
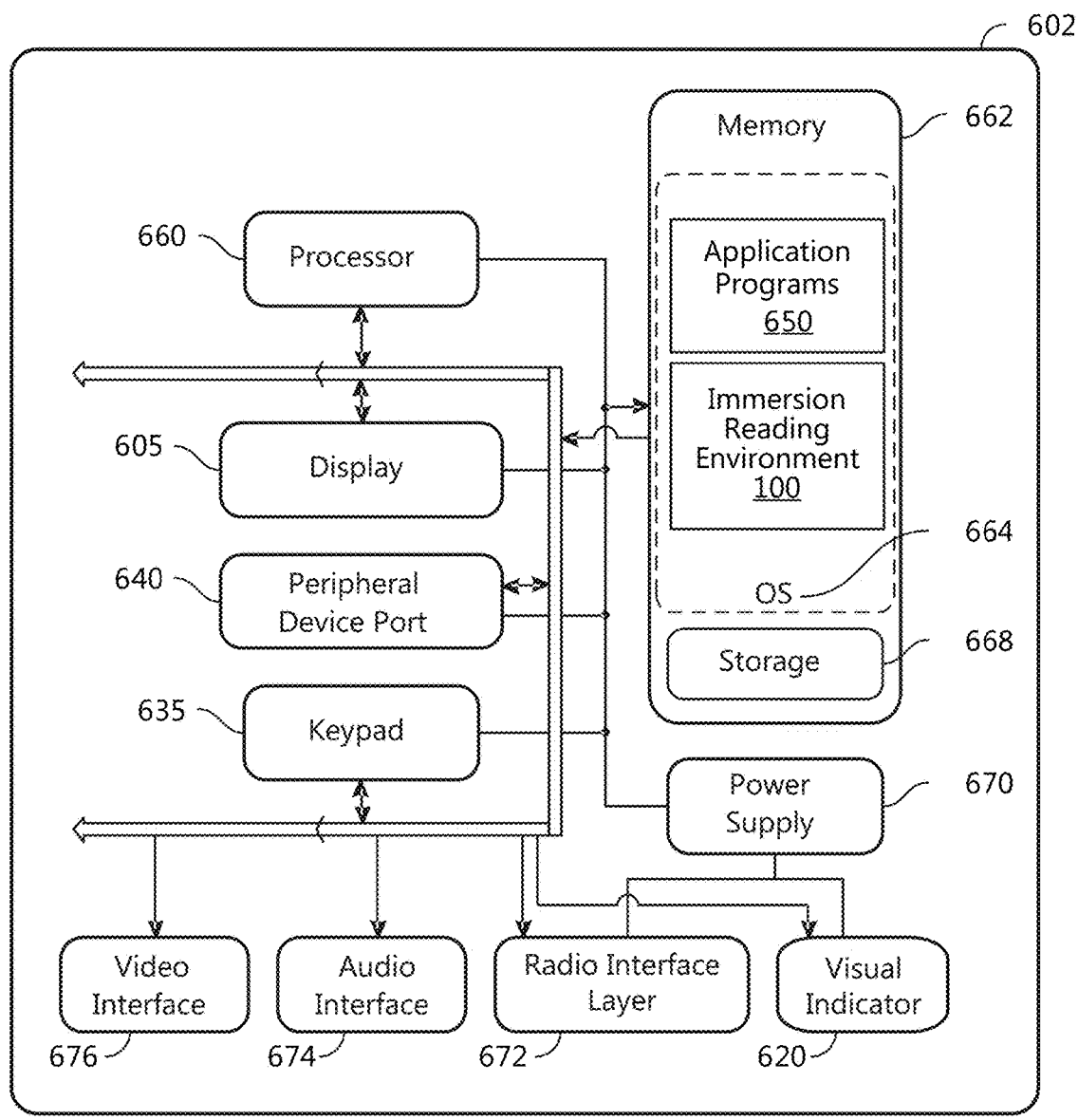
Figure 7:
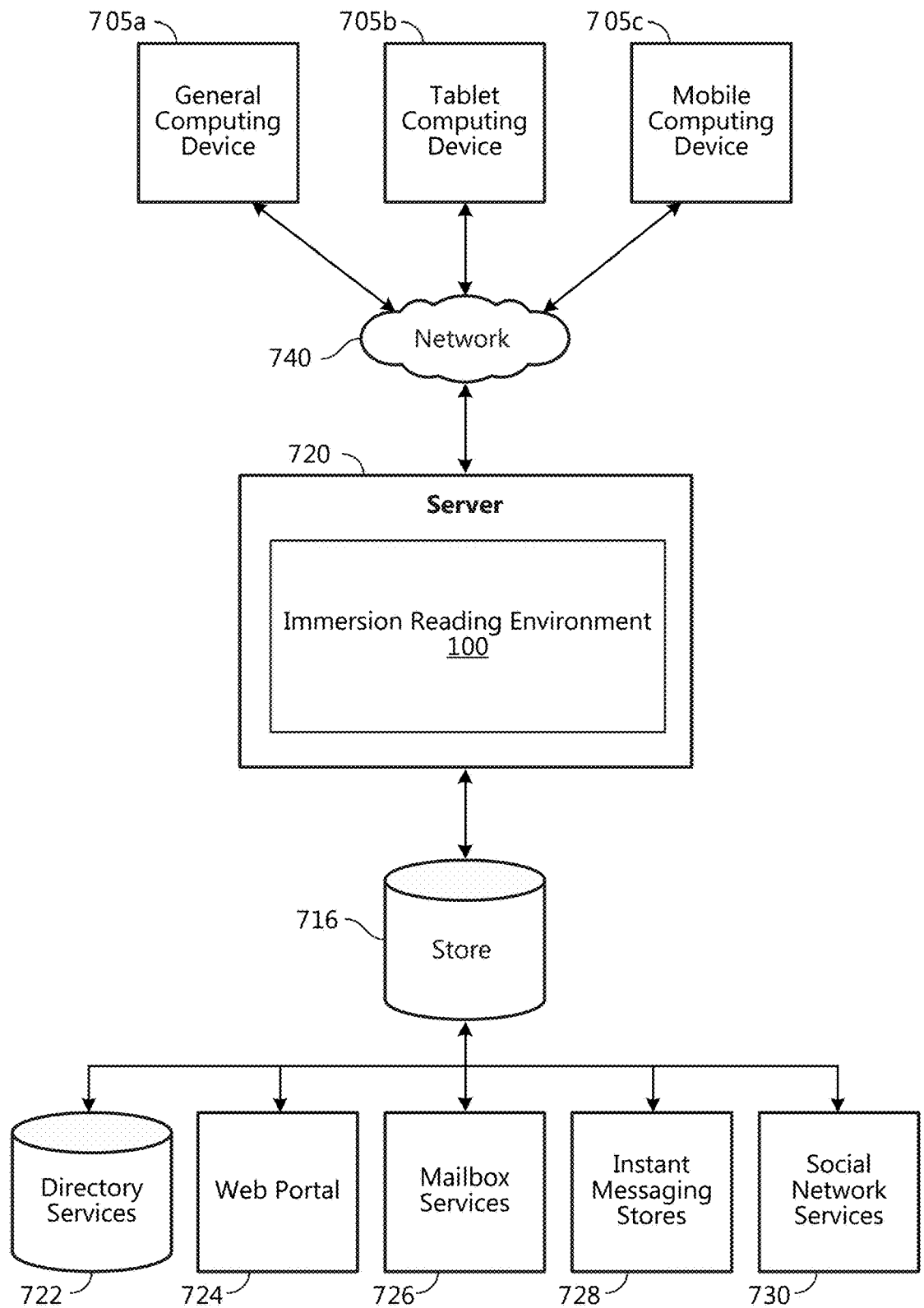
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the immersion reading environment 100. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., the immersion reading environment 100) perform processes including, but not limited to, one or more of the stages of the method 300 illustrated in FIG. 3 (and FIG. 4). According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the immersion reading environment 100 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for improving functionality and efficiency of electronic reading devices as described above. Content developed, interacted with, or edited in association with the immersion reading environment 100 is enabled to be stored in different communication channels or other storage types. For example, various documents may be stored using a directory service 722, a web portal 724, a mailbox service 726, an instant messaging store 728, or a social networking site 730. The immersion reading environment 100 is operative to use any of these types of systems or the like for providing greater functionality in e-readers by capturing and directing the reader's attention, as described herein. According to an aspect, a server 720 provides the immersion reading environment 100 to clients 705a,b,c. As one example, the server 720 is a web server providing the immersion reading environment 100 over the web. The server 720 provides the immersion reading environment 100 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving functionality and efficiency of an electronic reading device, comprising:
　　receiving a text to be presented to a reader using the electronic reading device, the text comprising lines, the lines comprising words;

reading back the text to the reader, wherein reading back comprises recursively:
  determining an active word in the text;
  determining, based on the active word, an active line in the text, the active line including the active word;
  displaying words comprising the active line according to a first text luminance;
  displaying words not comprising the active line according to a second text luminance;
  displaying a background behind the text according to a first background luminance;
  displaying a background behind the active word according to a second background luminance, wherein a difference between the first text luminance and first background luminance defines a first contrast, wherein a difference between the first text luminance and the second background luminance defines a second contrast, wherein a difference between the second text luminance and the first background luminance defines a third contrast, and wherein the second contrast is greater than the first contrast and the first contrast is greater than the third contrast;
  determining metatext to be displayed for at least one active word, the metatext providing additional information about the at least one active word;
  determining a vocalization for the active word; and
  in response to the text including a next word after the active word, selecting the next word as the active word for reading back next, wherein a delay between displaying the active word and selecting the next word is based on a vocalization for the active word, the determined metatext, and a pace defined by the reader.

2. The method of claim 1, further comprising:
playing, via an audio device in communication with the electronic reading device, the vocalization associated with the active word.

3. The method of claim 1, further comprising:
parsing the text, wherein parsing comprises identifying punctuation in the text; and
varying the pace of reading back the text based on the punctuation.

4. The method of claim 3, further comprising:
receiving, from the reader, a selected part of speech;
determining matching words in the text that match the selected part of speech and unmatching words in the text that do not match the selected part of speech; and
applying a different chrominance to the matching words than the unmatching words.

5. The method of claim 1, wherein reading back the text further comprises:
determining syllables that comprise the active word; and
when the active word comprises multiple syllables, displaying a spacer between each of the multiple syllables comprising the active word.

6. The method of claim 1, wherein the active word is displayed with a larger font size than other words in the active line.

7. The method of claim 1, wherein a tracking of the active word is adjusted to eliminate kerns when displaying the active word.

8. The method of claim 1, wherein when a link is associated with the active word in the text, the active word is displayed without indicia of the link.

9. The method of claim 1, wherein when the active word is misspelled, a suggested spelling is displayed as metatext in conjunction with the active word.

10. The method of claim 1, wherein when a font format is applied to the active word in the text, the active word is displayed without the font format, wherein the font format is selected from the group consisting of:
  superscript;
  sub script;
  underline;
  italics;
  bold;
  strikethrough; or
  small caps.

11. The method of claim 1, wherein the vocalization for the active word may vary depending on a location of the active word in a sentence.

12. A system for improving functionality and efficiency of an electronic reading device, comprising:
  a processing unit;
  a memory including instructions that when executed by the processing unit, configure the processing unit to:
    receive a text selection comprised of words organized into text lines;
    receive a readback speed;
    successively select from the text selection, a given word as an active word belonging to an active text line, select a next word from the text selection relative to the active word according to the readback speed until the active word is a last word of the text selection, and determine metatext to be displayed as additional information about at least one active word, wherein the readback speed is varied for the given word based on a number of syllables comprising the given word and the determined metatext; and
  apply on a graphical user interface of the electronic reading device:
    a first color as a background color to the text selection;
    a second color as a text color to the text selection;
    a third color as a text color to the active text line of the text selection; and
    a fourth color as a background color to the active word of the active text line of the text selection;
    wherein a first contrast between the fourth color and the third color is greater than a second contrast between the third color and the first color, and
    wherein the second contrast is greater than a third contrast between the first color and the second color.

13. The system of claim 12, wherein the readback speed is varied for the given word based on a punctuation proximate to the given word in the text selection.

14. The system of claim 12, wherein the readback speed is adjustable by a reader.

15. The system of claim 12, wherein the receiver is operable to receive a pause command to pause readback of the text selection.

16. The system of claim 12, where the first color, the second color, the third color, and the fourth color are colors are monochromatic.

17. The system of claim 12, wherein the processing unit is configured to divide the text selection into the text lines comprised of subsets of the words comprising the text selection, wherein the text selection is divided into the text lines based on a font size of the words relative to a display size of the electronic reading device.

18. The system of claim 12, wherein the processing unit is configured to: parse the text selection to determine and index for each word: a part of speech, a vocalization, and a syllabication;
   in response to a reader selection for part of speech identification, enhance the text according to the part of speech;
   in response to a reader selection for syllabication identification, enhance the text according to the syllabication;
   in response to a reader selection for vocalization playback, cause the electronic reading device to play back the vocalization for the active word on selection of the active word; and
   receive the reader selection for part of speech identification, the reader selection for syllabication identification, and the reader selection for vocalization playback.

19. A method for improving functionality and efficiency of an electronic reading device, comprising:
   dividing a text into a plurality of lines comprised of words, wherein a number of words comprising each line is based on a display space of the electronic reading device, a font size for characters comprising the text, and a tracking distance between the characters;
   parsing the words to identify a part of speech, a syllabication, and a vocalization for each of the words;
   organizing the part of speech, the syllabication, and the vocalization into a metatext index;
   providing readback controls in a graphical user interface of the electronic reading device to select text effects of part of speech indicia, syllabication indicia, vocalization playback, and readback;
   in response to receiving a selection for part of speech indicia, inserting part of speech indicia for each of the words comprising the text;
   in response to receiving a selection for syllabication indicia, inserting syllabication indicia for each of the words comprising the text;
   in response to receiving a selection for readback and a selection for vocalization playback:
      receiving a readback speed;
      selecting an active word from the text according to a reader position in the text;
      immersing the text, wherein immersing the text comprises:
         retrieving the vocalization associated with the active word;
         lowlighting the text on the electronic reading device by applying a first background color to a canvas and a first text color to the text, wherein a first contrast between the first background color and the first text color is low;
         highlighting the text in an active line to which the active word belongs by applying a second text color to the words comprising the active line, wherein a second contrast between the first background color and the second text color is greater than the first contrast;
         highlighting the active word by applying a second background color to a word box surrounding the active word, wherein a third contrast between the second background color and the second text color is greater than the second contrast; and
         playing back the vocalization on the electronic reading device;
      determining whether the reader position is at a last word in the text;
      when it is determined that the reader position is not at the last word in the text:
         pausing for a time based on the readback speed and a duration of the vocalization indexed to the active word;
         advancing the reader position to a next word in the text;
         selecting the next word as the active word; and
         immersing the text; and
   in response to receiving the selection for readback and no selection for vocalization playback:
      receiving the readback speed;
      selecting the active word from the text according to the reader position in the text;
      enhancing a contrast of the text, wherein enhancing the contrast of the text comprises:
         lowlighting the text on the electronic reading device by applying the first background color to the canvas and the first text color to the text, wherein the first contrast between the first background color and the first text color is low;
         highlighting the text in the active line to which the active word belongs by applying the second text color to the words comprising the active line, wherein the second contrast between the first background color and the second text color is greater than the first contrast; and
         highlighting the active word by applying the second background color to the word box surrounding the active word, wherein the third contrast between the second background color and the second text color is greater than the second contrast;
      determining whether the reader position is at a last word in the text;
      when it is determined that the reader position is not at the last word in the text:
         pausing for a time based on the readback speed and the syllabication indexed to the active word;
         advancing the reader position to the next word in the text;
         selecting the next word as the active word; and
         enhancing the contrast of the text.

20. The method of claim 19, wherein in response to receiving the selection for readback, the syllabication indicia for each of the words are inserted when each of the words is selected as the active word and removed when the next word is selected as the active word.

21. A method for improving functionality and efficiency of an electronic reading device, comprising:
   parsing words comprising a text to identify at least one of a syllabication and a vocalization as text enhancements for each of the words;
   displaying indicia relative to the words for the text enhancements in a graphical user interface of the electronic reading device;
   determining metatext to be displayed in proximity to at least one of the words in the graphical user interface, the metatext providing additional information about the at least one of the words;
   engaging a readback of the text, wherein each of the words comprising the text is selected one at a time as an active word and the readback of each of the words comprising the text is varied based on the syllabication, vocalization, and metatext determined for the active word; and highlighting the active word, wherein a text color and a text box color for the active word define a greatest contrast in the graphical user interface.

22. The method of claim 21, where highlighting further comprising:
a second text color and a second text box color for an active line in the text to which the active word belongs define a second greatest contrast in the graphical user interface.

23. The method of claim 22, wherein one of the second text color is the same as the text color for the active word or the second text box color is the same as the text box color for the active word.

\* \* \* \* \*